United States Patent
Verhallen et al.

(10) Patent No.: US 9,348,780 B2
(45) Date of Patent: May 24, 2016

(54) CIRCUIT AND METHODS TO USE AN AUDIO INTERFACE TO PROGRAM A DEVICE WITHIN AN AUDIO STREAM

(75) Inventors: Jakobus Johannes Verhallen, Oss (NL); Marinus Wilhelmus Kruiskamp, 's-Hertogenbosch (NL); Wessel Harm Lubberhuizen, Deldon (NL)

(73) Assignee: Dialog Semiconductor B.V., 's-Hertogenbosch (NL)

( * ) Notice: Subject to any disclaimer, the term of this patent is extended or adjusted under 35 U.S.C. 154(b) by 758 days.

(21) Appl. No.: 13/489,857

(22) Filed: Jun. 6, 2012

(65) Prior Publication Data

US 2013/0322439 A1 Dec. 5, 2013

(30) Foreign Application Priority Data

Jun. 4, 2012 (EP) .................................... 12368014

(51) Int. Cl.
| | |
|---|---|
| *H04L 12/56* | (2006.01) |
| *G06F 13/38* | (2006.01) |
| *H04J 3/12* | (2006.01) |
| *H04L 12/54* | (2013.01) |
| *H04B 1/10* | (2006.01) |
| *H04L 7/00* | (2006.01) |

(52) U.S. Cl.
CPC ................. *G06F 13/385* (2013.01); *H04J 3/12* (2013.01); *H04L 12/56* (2013.01); *H04B 1/10* (2013.01); *H04L 7/0083* (2013.01)

(58) Field of Classification Search
None
See application file for complete search history.

(56) References Cited

U.S. PATENT DOCUMENTS

| | | | | |
|---|---|---|---|---|
| 4,740,955 A | * | 4/1988 | Litterer et al. | ................ 370/264 |
| 5,007,050 A | | 4/1991 | Kasparian et al. | |
| 5,577,044 A | * | 11/1996 | Oxford | ......................... 370/522 |

(Continued)

FOREIGN PATENT DOCUMENTS

| | | |
|---|---|---|
| DE | 4430864 | 3/1996 |
| EP | 1 830 267 | 9/2007 |

(Continued)

OTHER PUBLICATIONS

"I²S bus specification," Phillips Semiconductors, Feb. 1986, Revised: Jun. 5, 1996, pp. 1-7.

(Continued)

*Primary Examiner* — Jeffrey M Rutkowski
*Assistant Examiner* — Jonathan B Wood
(74) *Attorney, Agent, or Firm* — Saile Ackerman LLC; Stephen B. Ackerman; Billy Knowles

(57) ABSTRACT

Method and apparatus for controlling a digitized analog audio device from a control circuit communicating with the digitized analog audio device with a serial digital analog audio protocol on a serial communication medium multiplexes command data words within digitized analog audio data frames. The digitized analog audio device extracts the command data words from the digitized analog audio data frames. The command data word includes a keyword packet, a command packet, an optional address packet, and an optional data packet. The keyword packet, a command packet, an optional address packet, and an optional data packet are each inserted into a separate number of truncated digitized analog audio data frames for iterative and successive transmission. The iterative transmission of the packets of the command word decreases the likelihood that digitized analog audio frames would contain packets of the command word.

60 Claims, 17 Drawing Sheets

(56) References Cited

U.S. PATENT DOCUMENTS

| | | | | |
|---|---|---|---|---|
| 5,771,396 | A * | 6/1998 | Arnold | 710/20 |
| 6,181,736 | B1 * | 1/2001 | McLaughlin et al. | 375/222 |
| 6,603,746 | B1 * | 8/2003 | Larijani et al. | 370/318 |
| 6,633,613 | B1 * | 10/2003 | Houlberg | 375/240.26 |
| 6,782,066 | B1 * | 8/2004 | Nicholas et al. | 375/368 |
| 7,127,537 | B2 | 10/2006 | Schreiber et al. | |
| 7,159,164 | B1 * | 1/2007 | Saifuddin et al. | 714/755 |
| 7,180,902 | B1 * | 2/2007 | Raaf et al. | 370/441 |
| 7,764,671 | B2 | 7/2010 | Tran et al. | |
| 7,920,603 | B2 | 4/2011 | Ross | |
| 8,155,096 | B1 * | 4/2012 | Proctor, Jr. | 370/342 |
| 2003/0110509 | A1 * | 6/2003 | Levinson et al. | 725/121 |
| 2003/0118136 | A1 * | 6/2003 | Tiedemann et al. | 375/354 |
| 2003/0226071 | A1 * | 12/2003 | Millar | 714/712 |
| 2004/0203397 | A1 * | 10/2004 | Yoon et al. | 455/63.1 |
| 2004/0252668 | A1 * | 12/2004 | Ozukturk et al. | 370/335 |
| 2005/0069044 | A1 * | 3/2005 | Iacono et al. | 375/259 |
| 2005/0089049 | A1 * | 4/2005 | Chang et al. | 370/396 |
| 2005/0107108 | A1 * | 5/2005 | Hamalainen et al. | 455/522 |
| 2006/0045138 | A1 * | 3/2006 | Black et al. | 370/516 |
| 2006/0193293 | A1 * | 8/2006 | Duval et al. | 370/331 |
| 2007/0015485 | A1 * | 1/2007 | DeBiasio et al. | 455/345 |
| 2007/0113162 | A1 * | 5/2007 | Lery | 714/800 |
| 2007/0124150 | A1 * | 5/2007 | Sinai | 704/500 |
| 2007/0124639 | A1 * | 5/2007 | Shiizaki et al. | 714/748 |
| 2007/0143801 | A1 | 6/2007 | Madonna et al. | |
| 2007/0160012 | A1 * | 7/2007 | Liu | 370/334 |
| 2007/0268986 | A1 * | 11/2007 | Morita | 375/295 |
| 2008/0258953 | A1 * | 10/2008 | Farley | 341/144 |
| 2009/0036168 | A1 * | 2/2009 | Nawata | H04L 1/0079 455/561 |
| 2009/0073922 | A1 * | 3/2009 | Malladi et al. | 370/328 |
| 2009/0135786 | A1 * | 5/2009 | Michel et al. | 370/335 |
| 2009/0154502 | A1 | 6/2009 | Ross et al. | |
| 2009/0161742 | A1 * | 6/2009 | Ivory et al. | 375/225 |
| 2009/0207851 | A1 * | 8/2009 | Nosley | 370/431 |
| 2009/0219918 | A1 * | 9/2009 | Lee et al. | 370/350 |
| 2009/0245208 | A1 * | 10/2009 | Liu et al. | 370/335 |
| 2010/0091735 | A1 * | 4/2010 | Kim et al. | 370/331 |
| 2010/0138724 | A1 * | 6/2010 | Fogel | H04L 1/0084 714/774 |
| 2010/0142642 | A1 * | 6/2010 | Lee | H04L 1/0026 375/295 |
| 2010/0254331 | A1 * | 10/2010 | Kim et al. | 370/329 |
| 2010/0303046 | A1 * | 12/2010 | Braithwaite et al. | 370/338 |
| 2011/0090897 | A1 * | 4/2011 | Johnson et al. | 370/350 |
| 2011/0135304 | A1 * | 6/2011 | Katagiri et al. | 398/45 |
| 2011/0303753 | A1 * | 12/2011 | Alleshouse | 235/492 |
| 2012/0027112 | A1 * | 2/2012 | Jiang et al. | 375/267 |
| 2012/0203560 | A1 * | 8/2012 | Poulsen | G06F 3/162 704/500 |
| 2012/0275374 | A1 * | 11/2012 | Kalfon et al. | 370/328 |
| 2013/0096931 | A1 * | 4/2013 | Poulsen | G10L 19/018 704/501 |

FOREIGN PATENT DOCUMENTS

| | | |
|---|---|---|
| EP | 2 017 831 | 1/2009 |
| EP | 2 487 858 | 8/2012 |

OTHER PUBLICATIONS

"Study on Asynchronous Data Transmission of MediaLB Bus Communication," by Jong-Wook Jang et al., Convergence and Hybrid Information Technology—5th International Conference, ICHIT 2011, Daejeon, Korea, Sep. 22-24, 2011, Proceedings, pp. 54-63.

* cited by examiner

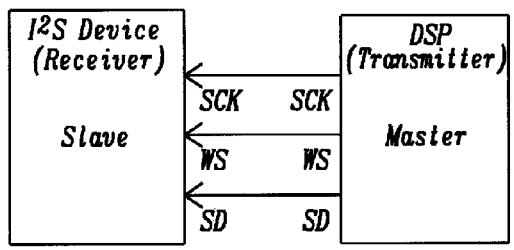
FIG. 2a – Prior Art
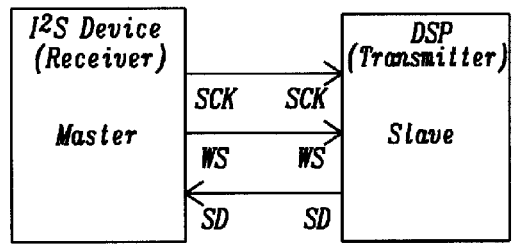
FIG. 2b – Prior Art
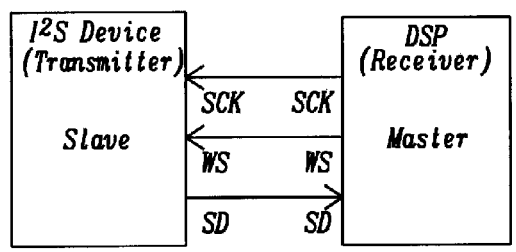
FIG. 2c – Prior Art
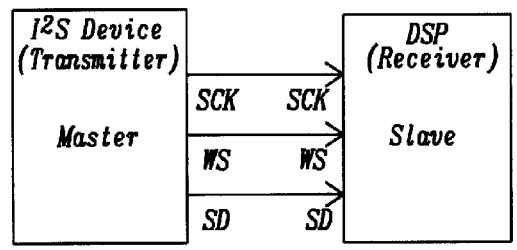
FIG. 2d – Prior Art
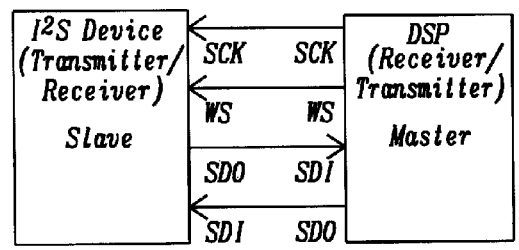
FIG. 2e – Prior Art
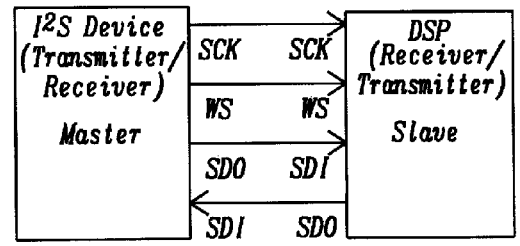
FIG. 2f – Prior Art

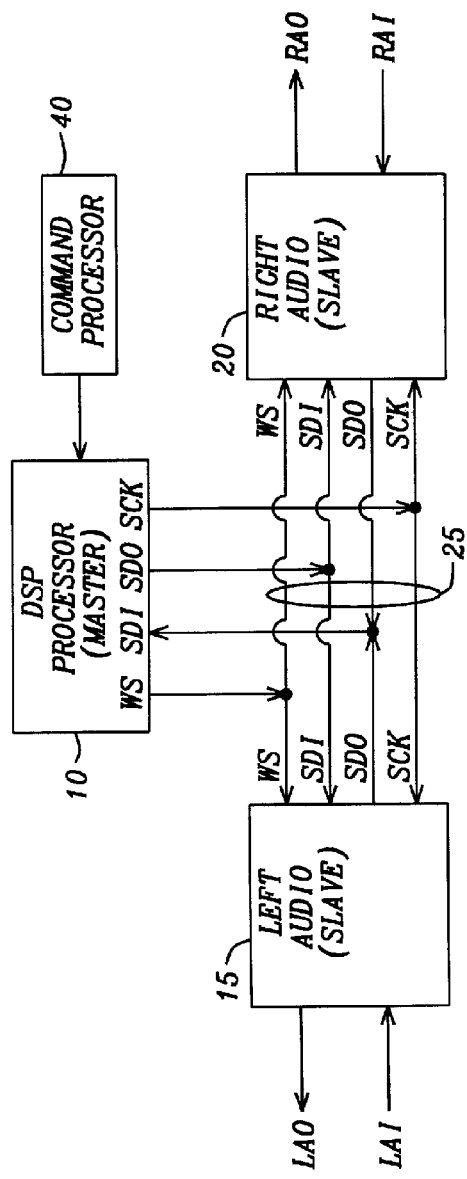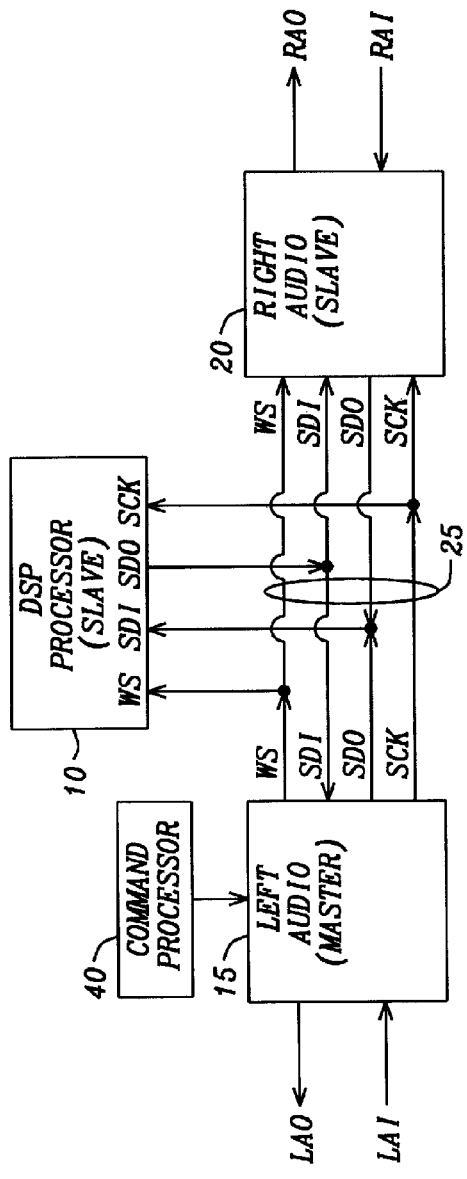
FIG. 5a
FIG. 5b

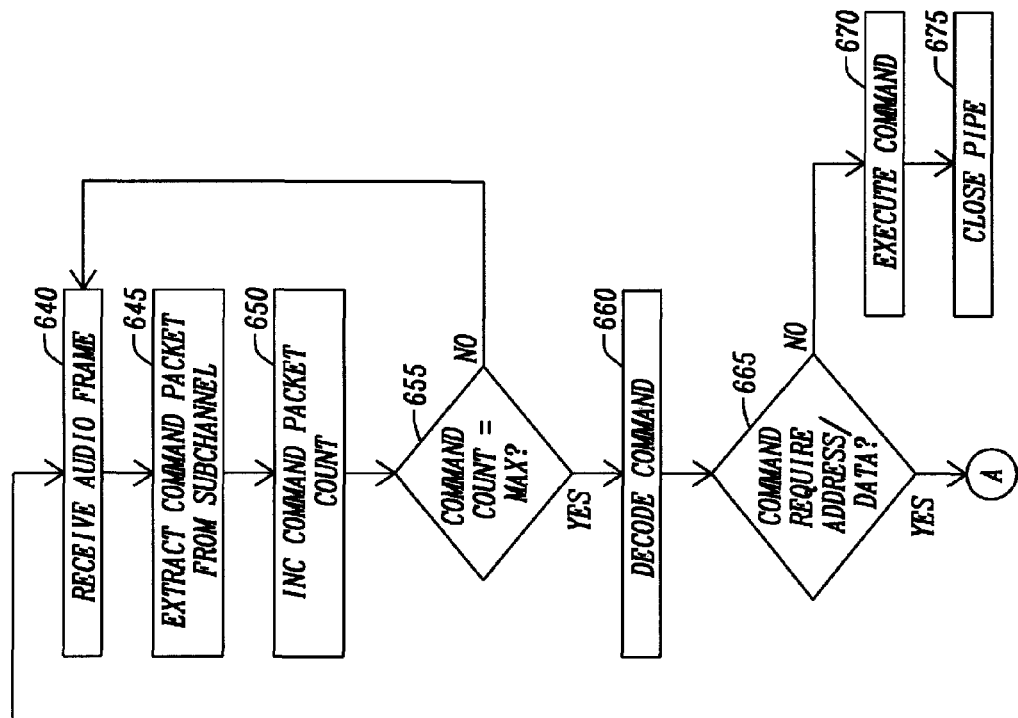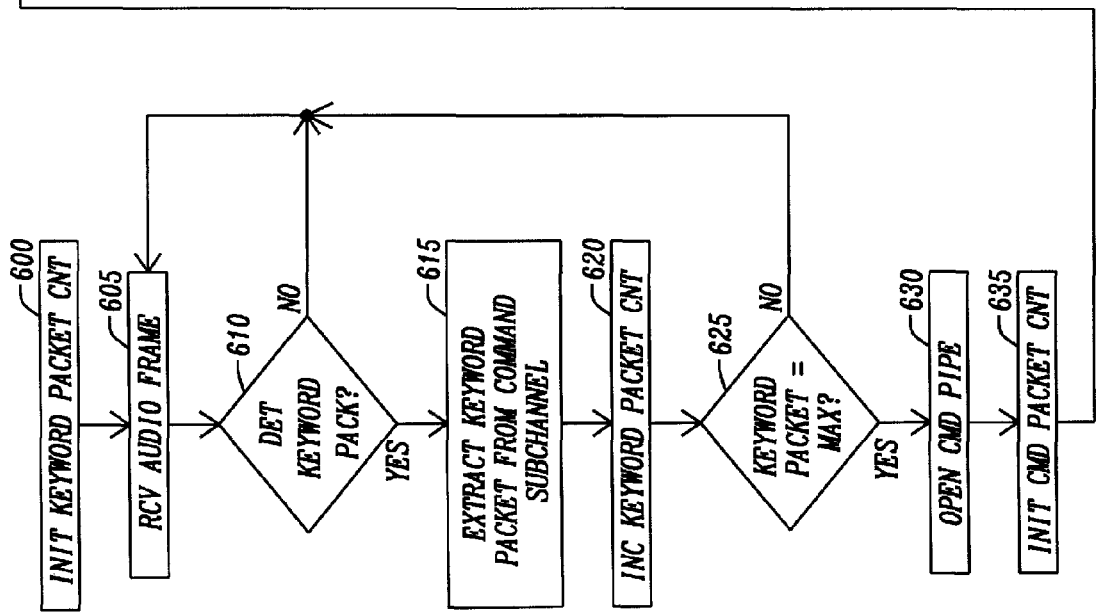
FIG. 12a

CIRCUIT AND METHODS TO USE AN AUDIO INTERFACE TO PROGRAM A DEVICE WITHIN AN AUDIO STREAM

TECHNICAL FIELD

This disclosure relates generally to circuits and methods for digital data communications. More particularly, this disclosure relates to circuits and methods for serial digital data communications, where the serial digital data is pulse coded modulated digital data of analog signals transferred on a serial communication medium. Even more particularly, this disclosure relates to circuits and methods for multiplexing pulse coded modulated digital data signals with serialized digital programming data.

BACKGROUND

Reducing the number of pins required by an integrated circuit is an important aspect for reducing the size and cost of the integrated circuit. This is also true for monaural audio integrated circuit devices with a serial pulse code modulated (PCM) audio interface. These serial audio interfaces often have multiple channels multiplexed to a serial data stream. In a stereo audio environment, two audio signals ("left" and "right") are digitized and then time-multiplexed for transmission over the same interface. The audio integrated circuit device has at least one additional pin that is used to select the audio integrated circuit device as either a "left" channel device or a "right" channel device. The number of input/output pins on integrated circuits that have a relatively low number of pins, impacts the size of the integrated circuit and the package into which the integrated circuit is mounted. Having fewer pins can improve the size and cost of the audio integrated circuit.

An example of a serial audio interface is the "Integrated Inter-chip Sound" (I²S) developed in 1986 and revised in 1996 by Philips Semiconductor N.V. (NXP Semiconductor N.V., Eindhoven, the Netherlands) and is well known in the art. The I²S bus is designed for the transfer of only audio data, while the other signals, such as sub-coding and control, are transferred separately. To minimize the number of pins required and to keep wiring simple, a 3-line serial bus is used. Referring to FIG. 1, the I²S bus consists of a serial data SD line that has two time-multiplexed data channels (LEFT CHANNEL and RIGHT CHANNEL), a word select WS line for designating the channel boundaries, and a clock line SCK for synchronizing the transmission and reception of the data. The two time-multiplexed data channels (LEFT CHANNEL and RIGHT CHANNEL) are transmitted sequentially.

Since the transmitter and receiver have the same clock signal SCK for data transmission, the transmitter, as the master, has to generate the bit clock SCK, word-select signal WS and the serial data SD. In complex systems however, there may be several transmitters and receivers, which makes it difficult to define the master. In such systems, there is usually a system master controlling digital audio data-flow between the various ICs. Transmitters then, have to generate the serial data SD under the control of an external clock SCK and an external word-select signal WS. The transmitters then act as a slave.

The serial data is transmitted in two's complement pulse coded modulation (PCM) with the most significant bit (MSB) first. The MSB is transmitted first because the transmitter and receiver may have different word lengths. It isn't necessary for the transmitter to know how many bits the receiver can handle, nor does the receiver need to know how many bits are being transmitted. When the system word length is greater than the transmitter word length, the word is truncated (least significant data bits are set to '0') for data transmission. If the receiver is sent more bits than its word length, the bits after the LSB are ignored. On the other hand, if the receiver is sent fewer bits than its word length, the missing bits are set to zero internally. And so, the MSB has a fixed position, whereas the position of the LSB depends on the word length. The transmitter always sends the MSB of the next word one clock period after the word select signal WS changes. Serial data SD sent by the transmitter may be synchronized with either the trailing (HIGH-to-LOW) or the leading (LOW-to-HIGH) edge of the clock signal SCK. However, the serial data must be latched into the receiver on the leading edge of the serial clock signal.

The word select line WS indicates the channel being transmitted. Where the word select line WS=0, the LEFT CHANNEL is selected and where the word select line=1 the RIGHT CHANNEL is selected. The word select line WS may change either on a trailing or leading edge of the serial block (a string of bits from the most significant bit (MSB) to the least significant bit (LSB), but it does not need to be symmetrical. In the slave, this signal is latched on the leading edge of the clock signal. The word select line WS changes one clock period before the MSB is transmitted. This allows the slave transmitter to derive synchronous timing of the serial data that will be set up for transmission. Furthermore, it enables the receiver to store the previous data packet (n−1, n, n+1) and clear the input for the next word (n−1, n, n+1).

FIGS. 2a-2f are block diagrams of configurations of transmitter devices and receiver devices communicating audio signals on an I²S serial communication interface. In FIG. 2a, a digital signal processor DSP is a master device transmitting the serial bit clock SCK, the word select WS or channel select clock, and the serial data SD to a receiving I²S device acting a slave. In this example, the slave device would be a loudspeaker.

In FIG. 2b, the receiving I²S device is acting as the master device generating and transmitting the serial bit clock SCK and the word select WS. The digital signal processor DSP is the slave device transmitting the serial data SD to the master. In this example, the master device would be the loudspeaker, but would also have the clock generating circuitry for the I²S bus.

In FIG. 2c, the digital signal processor DSP is a master device transmitting the serial bit clock SCK and the word select WS to the I²S device acting a slave. The I²S device transmits the serial data SD to the digital signal processor DSP. In this example, the slave device would be a microphone.

In FIG. 2d, the I²S device is acting as the master device generating and transmitting the serial bit clock SCK, the word select WS, and transmitting the serial data SD to the digital signal processor DSP that is a slave device. In this example, the master device would be the microphone with digitizing circuitry for creating the digitized analog (audio) signal for the serial data bus SD. The I²S device also has the clock generating circuitry for the serial bit clock SCK and the word select clock WS for the I²S bus.

In FIG. 2e, the digital signal processor DSP is the master device transmitting the serial bit clock SCK, the word select WS, and the serial data SDO to a receiving I²S device acting a slave. In this example, the slave device also transmits a serial data SDI to the digital signal processor DSP. In this case, the I²S device may be a combination of a microphone and a loudspeaker in the same unit with the serial data SDI providing the digitized analog signal from the microphone.

In FIG. 2f, the I²S device is the master device transmitting the serial bit clock SCK, the word select WS, and the serial data SDO to the digital signal processor DSP acting a slave. In this example, the digital signal processor DSP also transmits a serial data SDI to the I²S device. In this case, the I²S device may be a combination of a microphone and a loudspeaker in the same unit with the serial data SDI providing the digitized analog signal from the microphone. In FIGS. 2a-2f, the master device is the generator and transmitter of the serial bit clock SCK and the word select WS signals.

A digital audio device, e.g. a loudspeaker or microphone amplifier that is connected using the I²S bus as described above has a limited pin count. It usually contains only the I²S bus and power supply pins. In order to configure the digital audio device, a separate command bus using an interface such as the Inter-Integrated Circuit (I²C) bus maybe added to the audio device. However, this added circuitry requires more pins, consumes more power and occupies more space causing the physical dimensions of the audio device to grow. Interfaces such as the I²C generally require a number of bits that are used as a preamble that is transmitted before an actual audio stream may start. This has a disadvantage in that the digital audio device can only be programmed once in an audio stream transmission. If a change in the settings is required during the audio stream transmission, the audio stream transmission will be forced to stop. This stopping of the audio stream transmission is very audible.

SUMMARY

An object of this disclosure is to provide a method for controlling a digital audio device from a control circuit communicating with the digital audio device with a serial digital audio protocol on a serial communication medium.

Another object of this disclosure is to provide a circuit for multiplexing control data with digitized analog data.

Further, another object of this disclosure is to provide a circuit for extracting and implementing control data from a stream of multiplexed control data and digitized analog data.

To accomplish at least one of these objects, a control device has a transmitter that includes an analog signal to digital converter-encoder to generate a digitized analog signal. The transmitter has a command generator for generating a command packet that is to be executed by a receiving digital device. A keyword generator creates a keyword packet for indicating that a command is to be sent. A command serializing circuit serializes the keyword packet and the command packet.

The transmitter has a sub-channel control circuit that selects a sub-channel of a transmission time domain channel on which the keyword packet and the command packet is to be transmitted. The sub-channel control circuits generates control signals for a sub-channel multiplexer that selects frames of the digitized analog signal for transmission bit serially and truncates each frame of the digitized analog signal to insert the keyword packet and the command packets at selected sub-channels of the frames of the digitized analog signal. The truncation of the frames of the digitized analog signal reduces an amplitude of a reproduced analog signal based on the location of the selected sub-channel. The keyword packet is transmitted iteratively in multiple successive sub-channels of the frames of the digitized analog signal are followed by the transmission of the command packet iteratively in a second set of multiple successive sub-channels of the frames of the digitized analog signal. In some embodiments, the keyword packet and the command packet are each transmitted for sixty-four (64) iterations. In various embodiments, the keyword packet or the command packet is one byte (8 bits). In other embodiments, the keyword packet is a nibble of four (4) bits and may be constructed as two four (4) bit hexadecimal digits transmitted in two successive. In various embodiments, the key word data packet is the hexadecimal value (0X7E) for a tilde ().

The transmitter has a channel multiplexer that selects one time domain channel for transmission of the digitized analog signal, the keyword packet, and the command packet based on a word select signal generated by a master device connected to a control device containing the transmitter. In some embodiments, the transmitter is within the master device, in which case a channel clock generator within the master device generates the word select signal. A driver circuit is in communication with the channel multiplexer to condition and transmit the digitized analog signal with the appended keyword packet and the command packet according to a serial data communication protocol.

In various embodiments, a digitized analog receiving device is in communication with the control device to receive the frames of the sampled digitized analog signal that is transmitted according to the serial data protocol. The digitized analog receiving device has a receiver that acquires and conditions the transmitted frames of the digitized analog signal. The received frames of the digitized analog signal are transferred to a channel demultiplexer. The channel demultiplexer receives a word select signal that provides the identification of the channel in which the transmitted digitized analog signal is located. The word select signal is applied to the channel demultiplexer to extract the frames of the digitized analog signal.

The extracted frames of the digitized analog signal are an input to a command detector counter. The command detector counter examines a first number of the frames of the extracted digitized analog signal to determine that the digitized analog signal has been truncated and the keyword packet is present and appended to the digitized analog signal. If the keyword packet is present in the first number of the frames of the digitized analog data, a sub-channel demultiplexer is activated to extract the keyword packet from the truncated digitized analog signal and be transferred to a data deserializer. The data deserializer transfers the extracted keyword packet to a command interpreter that activates a command pipeline.

The command detector counter receives a second number of frames of the truncated digitized analog signal and instructs the sub-channel demultiplexer to extract the command packet from the second number of frames of the digitized analog signal and transfer one instance of the command packet to the command deserializer and to the command interpreter for execution.

Each of the deserialized words of the truncated analog data signal are transferred to an analog data signal decoder that converts the encoded analog data signal to an analog data signal that is resampled and low pass filtered. The filtered analog data signal is transferred to a digital-to-analog converter for conversion to a reproduction of the original analog signal.

In various embodiments, the command packets have address packets transferred iteratively subsequent to the command packets. The address packets are appended as the keyword packet and the command packet to the truncated analog data signal and are extracted for transfer to the command deserializer and then to the command interpreter. In some embodiments, address packets have data packets transferred iteratively subsequent to the address packets. The data packets are appended as the keyword packet and the command packets to the truncated analog data signal and are extracted for transfer to the command deserializer and then to the command interpreter.

In various embodiments, the deserialized command is a read operation that requires only the address packet. Alternately, the deserialized command is a write operation that requires the address packet and the data packet for execution.

In various embodiments, the keyword packet, the command packet, the address packet, and the data packet may have a cyclic redundancy check field appended during transmission. The cyclic redundancy check is verified and if cyclic redundancy check fails, the command packet, the address packet, or the data packet is discarded and the command packet, the address packet, or the data packet is counted. In the extreme, the operation aborted and the digitized analog receiving device is halted. In some embodiments, where the digitized analog receiving device is accompanied with a second control device, the digitized analog receiving device transmits an error message to the first control device requesting a retransmission of the command packet, the address packet, or the data packet.

In some embodiments, an analog communication system has a control device that generates a serial digitized analog signal. The control device has a command generator that receives a command request and generates a keyword packet, a command packet, an optional address packet, and an optional data packet. The control device has a sub-channel multiplexer that truncates the frames of the serial digitized analog signal and appends the keyword packet, the command packet, the optional address packet, and the optional data packet to the truncated frames of the serial digitized analog signal for transmission. The keyword packet iteratively transmitted with successive truncated frames of the serial digitized analog signal for the first number of times. Similarly, the command packet, the optional address packet, and the optional data packet are iteratively transmitted with successive truncated frames of the serial digitized analog signal for multiple times. The multiple transmissions insure that the keyword packet, the command packet, the optional address packet, and the optional data packet are received and extracted for execution.

The analog communications system has a digitized analog receiving device in communication with the control device through a transmission medium. The digitized analog receiving device acquires the truncated frames of the serial digitized analog signal with the appended keyword packet, the command packet, the optional address packet, or the optional data packet. The digitized analog receiving device has a command detector counter that detects the iterative copies of the keyword packet, a command packet, an optional address packet, and an optional data packet. Upon the completion of the count, a sub-channel demultiplexer transfers the truncated serial digitized analog signal for reproduction and transfers the keyword packet, the command packet, the optional address packet, or the optional data packet to a command deserializer. The command deserializer transfers the deserialized keyword packet, a command packet, an optional address packet, and an optional data packet to a command interpreter for execution.

In some embodiments, the control device has a cyclic redundancy check generator to generate a cyclic redundancy check code for the keyword packet, the command packet, the optional address packet, and the optional data packet and appended to the keyword packet, the command packet, the optional address packet, and the optional data packet. The command detector counter within the digitized analog receiving device has a cyclic redundancy check circuit that verifies the cyclic redundancy check code. If cyclic redundancy check fails, the command packet, the address packet, or the data packet is discarded and the command packet, the address packet, or the data packet is counted. In the extreme, the operation aborted and the and the digitized analog receiving device is halted. In some embodiments, where the digitized analog receiving device is accompanied with a transmitter, the digitized analog receiving device transmits an error message to the first control device requesting a retransmission of the command packet, the address packet, or the data packet.

In various embodiments, a method for transferring command instructions from a command device to a digitized analog device with a serial digitized analog communication protocol through a serial communication media begins by generating and serializing a command packet, generating and serializing an optional address packet, and generating and serializing an optional data packet. A keyword packet is then generated and serialized. A first number of serial digitized analog frames are truncated and the serialized keyword packet is appended to each of the first number of the truncated serial digitized analog frames. The truncated frames of the serial digitized analog frames with the appended keyword packet are transmitted iteratively for a number of times. In some embodiments, the keyword packet will be appended and transmitted 64 times.

Subsequent to the transmission of the keyword packet, a command packet is appended to the frames of the serial digitized analog signal and iteratively transmitted on the series communication media. Subsequent to the transmission of the command packet, the optional address is serialized and the optional address packets are appended to the frames of the serial digitized analog signal and iteratively transmitted on the series communication media. Subsequent to the transmission of the optional address packets, the optional data packets are appended to the frames of the serial digitized analog signal and iteratively transmitted on the series communication media.

The method for transferring the command instructions continues with the reception from the serial communication media of the first number of frames of the truncated serial digitized analog signals with the appended keyword packet. The keyword packet is extracted from the received frames of the truncated serial digitized analog signal and decoded. At the completion of the reception of a correct number of the keyword packets, the keyword packet is passed to a command interpreter to open a command pipeline to receive command packets. A second number of the frames of the truncated serial digitized analog signal with the command packet appended are iteratively received decoded and counted. When the second number of the command packets are received, the command packet is decoded and it is determined if an address packet and/or data packets are to be received. If the address packet is to be received, a third number of the frames of the truncated serial digitized analog signal with the address packet appended are iteratively received decoded and counted. When the third number of the address packets are received and if the data packets are to be received, a fourth number of the frames of the truncated serial digitized analog signal with the data packet appended are iteratively received decoded and counted. The command packet with the optional address packet and/or an optional data packet are transferred to a command interpreter within the slave device for execution.

The truncated digitized analog signal is processed and converted to a reproduction of the original analog signal for presentation. In various embodiments, the truncated digitized analog signal represents a sampled amplitude of the analog signal and will appear as an attenuation of the original signal. If the analog signal is an audio signal, there will be little perceived difference in the sound of the reproduced signal. In various embodiments, the serial digitized analog communication interface is an Integrated Inter-chip Sound ($I^2S$) bus. The length of the keyword packet, the command packet, the optional address packet, and the optional data packet truncates the frames of the analog signal. In various embodiments, the length of the keyword packet, the command packet, the optional address packet, and the optional data packet is one byte. In other embodiments, the length of the keyword packet, the command packet, the optional address packet, and the optional data packet is divided into two four (4) bit nibbles transmitted over two frames.

In some embodiments, the method for transferring the command instructions include generating a cyclic redundancy check code for the keyword packets, the command packets, the optional address packets, and the optional data packets. At the reception of the truncated serial digitized analog signal, the extracted keyword packets, a command packets, an optional address packets, and an optional data packets have their associated cyclic redundancy check code verified. If cyclic redundancy check fails, the command packet, the address packet, or the data packet is discarded and the command packet, the address packet, or the data packet is counted. In the extreme, the operation aborted and the digitized analog receiving device is halted. In some embodiments, the method for transferring the command instruction includes the digitized analog receiving device transmitting an error message to the command device requesting a retransmission of the command packet, the address packet, or the data packet.

BRIEF DESCRIPTION OF THE DRAWINGS

FIGS. 2a-2f are block diagrams of configurations of transmitter devices and receiver devices communicating audio signals on an $I^2S$ serial communication interface.

FIGS. 5a-5d are block diagrams of configurations of a host processor a signal process, transmitter devices, and receiver devices communicating analog signals on the serial digitized analog communication interface of this disclosure.

FIGS. 12a-12b are a flowchart of an embodiment of a method for receiving command instructions by a network device transmitted from a command processor with a serial digitized analog communication protocol through a serial communication media of this disclosure.

DETAILED DESCRIPTION

Figure 1:
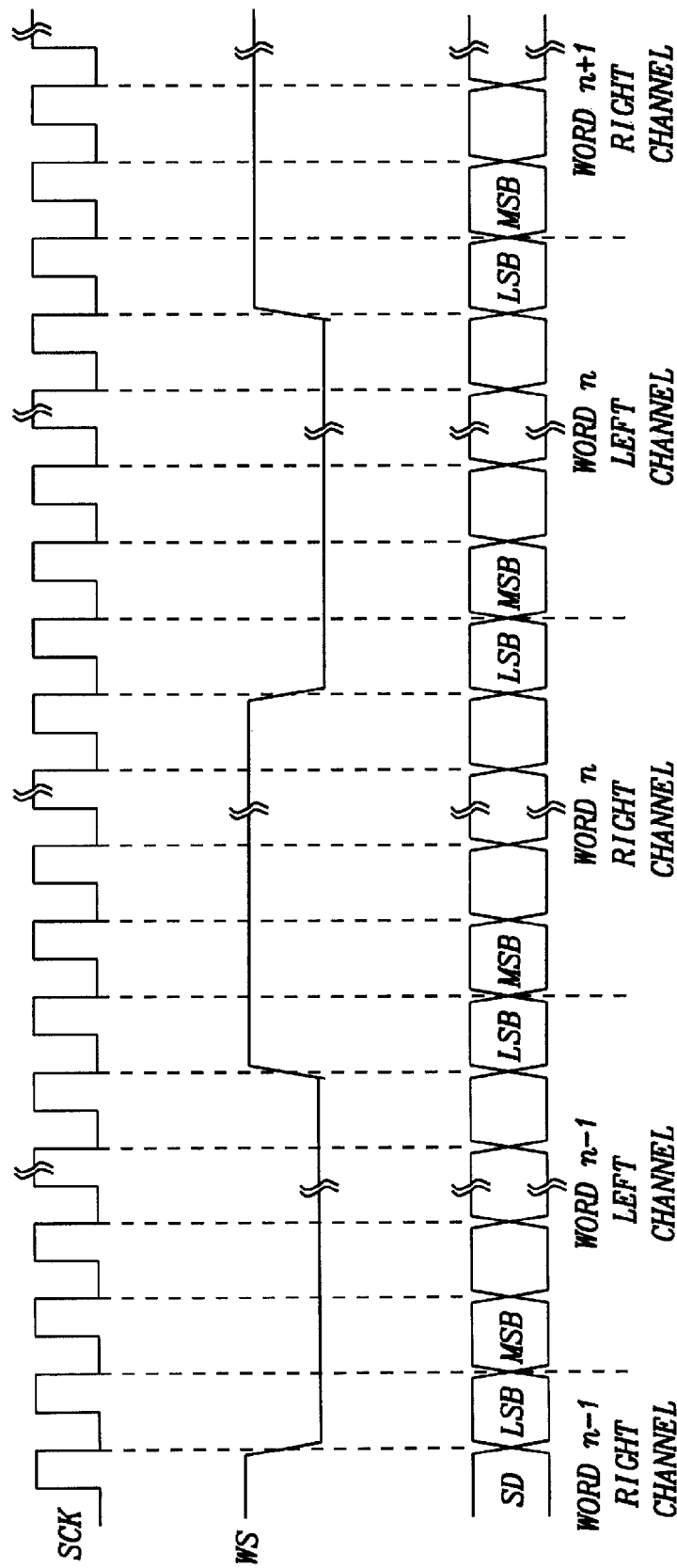
FIG. 1 is a graph of the timing and multiplexed serialized data stream signals of an $I^2S$ serial bus.

A serial digitized analog communication interface connects a transmitting device with a digitized analog receiving device. The interface has a serial data line for transmitting the digitized analog signal as a serial string of PCM data bits. A bit clock for timing each bit of the serial digitized analog signal and a word clock for selecting a frame of the digitized analog signal for transmission is transferred from a master device to a slave device. In digital communication systems having multiple transmitters, as in the $I^2S$ bus, the word clock permits the time domain multiplexing of the digitized analog signals from two transmitters or two receivers on the communication bus. In various embodiments of this disclosure, the serial digitized analog signal is truncated such that a command sequence is appended to the truncated serial digitized signal to create a time domain sub-channel for the command sequence. In various embodiments, a keyword packet is multiplexed with a number of the truncated digitized analog signal frames and iteratively transmitted serially through a serial communication media. At the completion of the sequence of iteratively transmitted keyword packets, a command packet is then multiplexed with a sequence of a second number of the truncated digitized analog signal frames and iteratively transmitted through the serial communication media. If the command to be executed requires an address, the address packet is multiplexed with a sequence of a third number of the truncated digitized analog signal frames and transmitted on the serial communication media. Similarly, if the command to be executed requires a data packet, the data packet is multiplexed with a sequence of a fourth number of the truncated digitized analog signal frames and transmitted through the serial communication media. The truncated digitized analog signal frame effectively attenuates the amplitude of the analog signal for reproduction. Once the keyword packet is accepted, a programming pipe is opened to accept the command packet, the address packet, and the data for execution.

In various embodiments, the keyword packet, the command packet, the address packet, and the data packet have a cyclic redundancy check code appended to the keyword packet, the command packet, the address packet, and the data packet. The receiver checks the cyclic redundancy code to determine if an error has occurred in the transmission. If an error has occurred and the digitized analog receiving device has a return transmission serial data line, the digitized analog receiving device requests a retransmission. If there is no return transmission serial data line, an error is declared and the digitized analog receiving device discards the keyword packet, the command packet, the address packet, or the data packet in error and accepts the next successive the keyword packet, the command packet, the address packet, or the data packet and continues operation. If all the iteratively transmitted keyword packets, command packets, address packets, or data packets are in error, the receiving device indicates an error and ceases operation.

Figure 3:
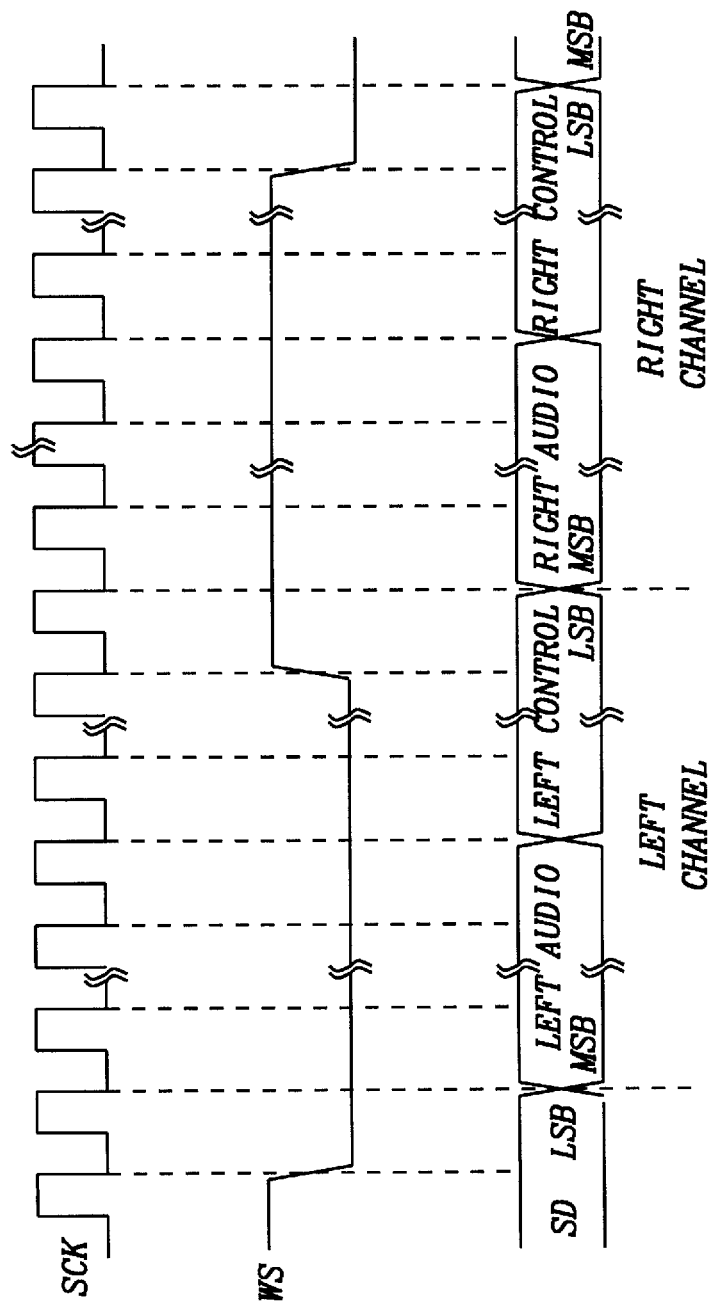
FIG. 3 is a graph of the timing and multiplexed serialized data stream signals of a serial digitized analog communication interface for transferring command instructions from a control device to a receiving device.

FIG. 3 is a graph of the timing and multiplexed serialized data stream signals of a serial digitized analog communication interface for transferring command instructions from a control device to a slave device. The basic structure of the protocol of the serial digitized analog communication interface of this disclosure is essentially identical to that of the I²S bus of FIG. 1. The difference being that the serial data line has the frames of the serial digitized analog signal truncated and a command sub-channel inserted to occupy the location of the least significant bits of the serial digitized analog frame. If a device is allocated to receive the serial digitized analog signal of the left channel, the left control word is located at the location of the least significant bits of the left channel. Equivalently, if a device is allocated to receive the serial digitized analog signal of the right channel, the right control word is located at the location of the least significant bits of the right channel.

Figure 4A:
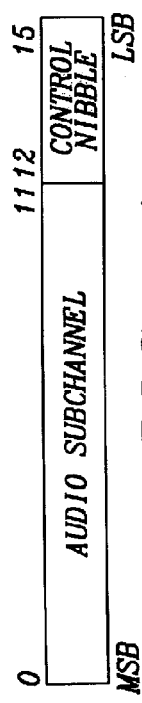
FIGS. 4a-4e are graphs of a communication channel of the serial digitized analog communication interface of FIG. 3 illustrating various embodiments for appending a command packet structure to a truncated digitized analog channel of this disclosure.

FIGS. 4a-4d are graphs of a communication channel of the serial digitized analog communication interface of FIG. 3 illustrating various embodiments for appending a command packet structure to a truncated digitized analog audio channel of this disclosure. In normal operation, the digitized analog audio channel has sub-channels that have a length that is unspecified for serial digitized analog audio signal. The length of the sub-channels as illustrated in FIGS. 4a-4d is selected to be 16 bits, 24 bits, and 32 bits for discussion. In FIG. 4a, the digitized analog audio sub-channel is initially sixteen bits in length and is truncated to twelve bits and the control symbol is one nibble (four bits) that forms a four bit hexadecimal digit. Two successive transmissions of the audio sub-channel with the control nibble are needed to provide the full control symbol. In some embodiments, the keyword symbol will be the ASCII code for a tilde () or the hexadecimal code "7E". The first audio sub-channel transmission would contain the control nibble with the keyword symbol for the hexadecimal code for a "7" and the second audio sub-channel transmission would contain the control nibble with the keyword symbol for the hexadecimal code for an "E". In forming the audio sub-channel with the control nibble, the four least significant bits (LSB) are truncated from the sixteen bits of audio data and the control nibble is appended to the twelve bits to form the audio sub-channel. The receiver extracts the control nibble and sets the least significant four bits of the sixteen bit audio sub-channel to a zero value. The zero value of the least significant bits will prevent noise in the reproduction of the audio signal.

Figure 4B:
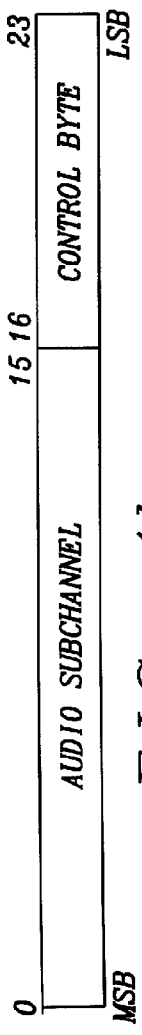

In FIG. 4b, the digitized analog audio sub-channel is initially twenty-four bits in length and is truncated to sixteen bits and the control symbol is one byte (eight bits) that forms two four bit hexadecimal digits and contains one symbol packet. In this case with the keyword symbol being the ASCII code for the tilde (), the entire control byte contains the keyword symbol packet that is the binary value for the hexadecimal digits "7E". In forming the audio sub-channel with the control byte, the eight least significant bits (LSB) are truncated from the twenty-four bits of audio data and the control byte is appended to the sixteen bits to form the audio sub-channel. The receiver extracts the control byte and sets the least significant eight bits of the twenty-four bit audio sub-channel to a zero value. As described above, the zero value of the least significant bits will prevent noise in the reproduction of the audio signal.

Figure 4C:
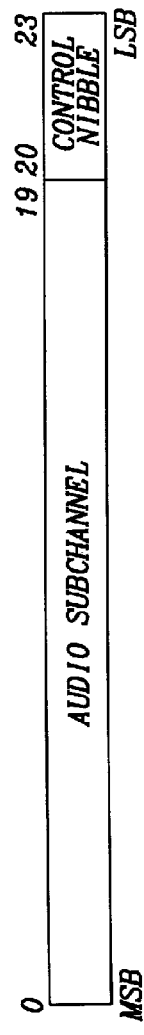

In FIG. 4c, the digitized analog audio sub-channel is initially twenty-four bits in length and is truncated to twenty bits and the control symbol is one nibble (four bits) that forms a four bit hexadecimal digit. Two successive transmissions of the audio sub-channel with the control nibble are needed to provide the full control symbol. In the case where the control symbol is the keyword symbol (ASCII code for a tilde () or the hexadecimal code "7E"), the first audio sub-channel transmission would contain the control nibble with the keyword symbol for the hexadecimal code for a "7" and the second audio sub-channel transmission would contain the control nibble with the keyword symbol for the hexadecimal code for an "E". In forming the audio sub-channel with the control nibble, the four least significant bits (LSB) are truncated from the twenty-four bits of audio data and the control nibble is appended to the remaining twenty bits to form the audio sub-channel. The receiver extracts the control nibble and sets the least significant four bits of the twenty-four bit audio sub-channel to a zero value. The zero value of the least significant bits will prevent noise in the reproduction of the audio signal.

Figure 4D:
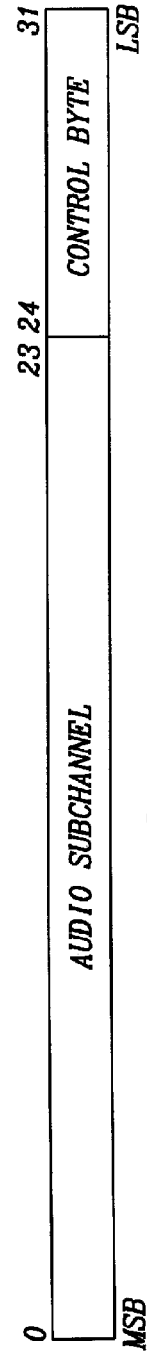

In FIG. 4d, the digitized analog audio sub-channel is initially thirty-two bits in length and is truncated to twenty-four bits and the control symbol is one byte (eight bits) that forms two four bit hexadecimal digits and contains one symbol packet. As above, with the keyword symbol being the ASCII code for the tilde (), the entire control byte contains the keyword symbol packet that is the binary value for the hexadecimal digits "7E". In forming the audio sub-channel with the control byte, the eight least significant bits (LSB) are truncated from the thirty-bits bits of audio data and the control byte is appended to the remaining twenty-four bits to form the audio sub-channel. The receiver extracts the control byte and sets the least significant eight bits of the twenty-four bit audio sub-channel to a zero value. As described above, the zero value of the least significant bits will prevent noise in the reproduction of the audio signal.

Figure 4E:

In FIG. 4e, the digitized analog audio sub-channel is initially thirty-two bits in length and is truncated to twenty-eight bits and the control symbol is one nibble (four bits) that forms a four bit hexadecimal digit. Two successive transmissions of the audio sub-channel with the control nibble are again needed to provide the full control symbol. In the case where the control symbol is the keyword symbol (ASCII code for a tilde () or the hexadecimal code "7E"), the first audio sub-channel transmission would contain the control nibble with the keyword symbol for the hexadecimal code for a "7" and the second audio sub-channel transmission would contain the control nibble with the keyword symbol for the hexadecimal code for an "E". In forming the audio sub-channel with the control nibble, the four least significant bits (LSB) are truncated from the thirty-two bits of audio data and the control nibble is appended to the remaining twenty-eight bits to form the audio sub-channel. The receiver extracts the control nibble and sets the least significant four bits of the thirty-two bit audio sub-channel to a zero value. The zero value of the least significant bits will prevent noise in the reproduction of the audio signal.

Figure 5C:
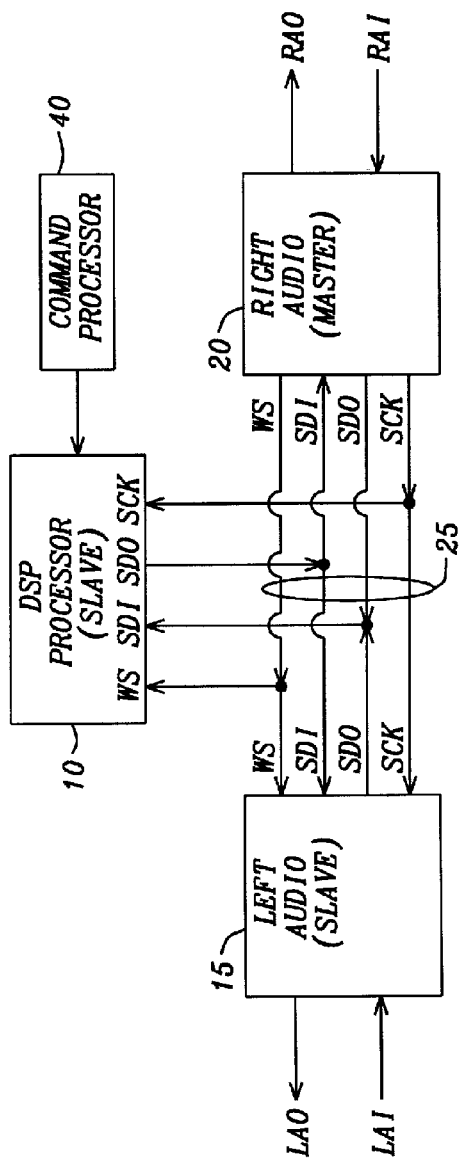
Figure 5D:
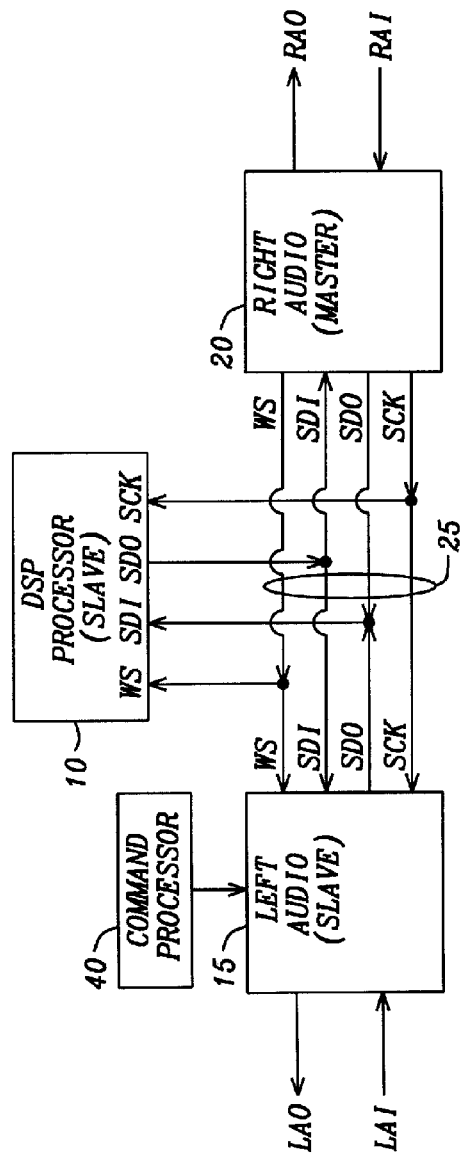

FIGS. 5a-5d are block diagrams of configurations of a data communication system with a command processor, a digital signal processor, transmitter devices, and receiver devices communicating digitized analog audio signals on the serial digitized analog communication interface of this disclosure. In FIG. 5a, a digital signal processor 10 is connected to a command processor 40 that provides control signals for the left audio device 10 and right audio device 15 to adjust the operation of the left audio device 10 and right audio device 15. The digital signal processor 10 performs measurement, filtering and/or compression of sampled and digitized analog signals. Further, in this example, the digital signal processor 10 is acting as a master for the serial communication network and therefore has a clocking generator for generating the serial bit clock SCK and the word select clock WS. In this embodiment, the digital signal processor 10 has a serial data transmitter connected to the serial data output SDO and a serial data receiver connected to the serial data input SDI. The serial data input SDI and the serial data output SDO are connected respectively to the first serial data line SD1 and the second serial data line SD2 of the serial data interface 25. The serial bit clock SCK and the word select clock WS provided the timing lines for the serial data interface 25. In various embodiments, the physical connections and timing of the serial bit clock SCK and the word select clock WS are identical to those described for the I²S bus as described above.

The left audio device 15 and the right audio device 20 are a slave devices that receives the serial data clock SCK and the word select clock WS. The left audio device 15 and the right audio device 20 each have a receiver connected to the serial data input SDI that is connected to the serial data interface 25 to receive transmissions from the serial data output SDO of the transmitter of the digital signal processor 5. The left audio device 15 and the right audio device 20 each decode the digitized analog signal transmitted through the serial data input SDI from the serial data interface 25. The word select signal WS determines on which channel that the left audio device 15 or the right audio device 20 receives digitized analog signal. The decoded analog signals in the left audio device 15 and the right audio device 20 are converted to analog signals and transmitted as a left analog (audio) output signal LAO and a right analog (audio) output signal RAO to a transducer such as a loudspeaker.

The left audio device 15 has a left analog (audio) input signal LAI from a transducer such as a microphone. Similarly, the right audio device 20 has a right analog (audio) input signal RAI from a transducer such as a second microphone. The left analog input signal LAI and the right analog signal RAI are each converted to a serial sampled digitized analog signal and based on the timing of the word select signal WS transmitted in their respective channels to their serial data outputs SDO onto the serial data interface 25 to the serial data input SDI of the digital signal processor 10 for further processing.

In various embodiments, the serial data interface 25 with the driving circuits SDO and the receiving circuits SDI essentially complies with the I²S protocol when only the serial digitized analog signal is being transferred. However, when a user of the data communication system desires to adjust a performance factor of one of the transducers (microphone or loudspeaker) connected to the data communication system, the digital signal processor 10 transmits a command to left audio device 15 and/or the right audio device 20. A number of successive frames of the serial digitized analog signal are truncated and the keyword packet is appended to each of the frames of the truncated serial digitized analog signal and transmitted on the appropriate time domain channel on the driving circuit SDO through the serial data interface 25 to the designated left or right audio device 15 or 20. In some embodiments the number of successive frames of the truncated digitized analog signal with the appended keyword packet is 64. Upon completion of the iterative transmission of the keyword packet, a second number of successive frames of the serial digitized analog signal are truncated and a command packet is appended to each of the frames of the truncated serial digitized analog signal and transmitted on the appropriate time domain channel on the driving circuit SDO through the serial data interface 25 to the designated left or right audio device 15 or 20. Again in some embodiments, the number of successive frames of the truncated digitized analog signal with the appended command packet is 64. Some of the commands such as a read from device memory will require an address and some commands such a write to the device memory will require an address and data. As with the keyword packet and the command packet, a third number of successive frames of the serial digitized analog signal are truncated and an address packet is appended to each of the frames of the truncated serial digitized analog signal and transmitted on the appropriate time domain channel on the driving circuit SDO through the serial data interface 25 to the designated left or right audio device 15 or 20. Again in some embodiments, the number of successive frames of the truncated digitized analog signal with the appended address packet is 64. The fourth number of frames of the serial digitized analog signal are truncated and a data packet is appended to each of the frames of the truncated serial digitized analog signal and transmitted on the appropriate time domain channel on the driving circuit SDO through the serial data interface 25 to the designated left or right audio device 15 or 20. Again in some embodiments, the number of successive frames of the truncated digitized analog signal with the appended data packet is 64.

The frames of the truncated serial digitized analog signal are received and the keyword is detected. Since, there is a probability that the digitized analog signal may legitimately contain the keyword code, the iterative transmission of the keyword packet appended to the truncated digitized analog signal decreases the likelihood that the keyword code is in fact the preamble to the transmission of a command. At the reception of the expected number of keyword packets, a command pipe is opened to activate a command processor within the designated left or right audio device 15 or 20. At the completion of the iterative transmissions of the keyword packet, a second number of the command packets is received. The command packet is transferred to the command processor for decoding and execution if no address and/or data is required. At the completion of the iterative transmissions of the command packet, a third number of the address packets are received. The address packet is transferred to the command processor for decoding and execution if no data packet is required. If a data packet is required, a fourth number of the iterative transmissions of the data packets are received and the data packet is transferred to the command processor for decoding and execution of the command.

The command processor 40, in some embodiments, is not connected to the digital signal processor 10 as shown in FIG. 5b. The command processor 40 is connected to be in communication with the left audio device 15. The user of the data communication system desired to adjust a performance factors of one of the transducers (microphone or loudspeaker) connected to the data communication system, the command processor 40 activates the transmission from the transmitter of the left audio device 15. In the embodiment as shown, the left audio device 15 is the master for the data communications network providing the serial bit clock SCK and the word select clock WS and digital signal processor 10 and the right audio device 20 are slave devices. The command processor 40 transmits commands to the digital signal processor 10 for modifying the performance of the digital signal processor during transmission or reception of the serial digitized analog signals.

In other embodiments, the command processor is connected to be in direct communication with the right audio device 20 (not shown). In this case, the left audio device 15 is the master generating the serial bit clock SCK and the word select clock WS. The right audio device is able to provide the keyword packets, command packets, optional address packets and optional data packets to the digital signal processor 10 from the command processor.

In various embodiments as shown in FIG. 5c, the digital signal processor 10 again is connected to the command processor 40. In this example, the digital signal processor 10 is a slave to the left audio device 15 acting as the master by generating the serial bit clock SCK and the word select clock WS. When the user of the data communication system desires to adjust a performance factor of one of the transducers (microphone or loudspeaker) connected to the data communication system, the digital signal processor 10 transmits a command to the left audio device 15 and/or the right audio device 20, as described above. In other embodiments (not shown) the right audio device 20 is the master and generates the serial bit clock SCK and the word select clock WS. Again the digital signal processor 10 transmits a command to the left audio device 15 and/or the right audio device 20, as described above.

In various embodiments, the right audio device 20 is the master generating the serial bit clock SCK and the word select clock WS. In this example the command processor 40 is connected to be in communication with the left audio device 15 and transmits commands to the digital signal processor 10 for modifying the performance of the digital signal processor during transmission or reception of the serial digitized analog signals.

In the structure of the embodiments as described above for FIGS. 5a-5d, the digital signal processor 10, the left audio device 15, and the right audio device 20 each have a transmitter connected to a serial data output SDO that is connected to the serial data interface 25. The command processor 40 places its instructions in the transmitted audio stream applied to serial data output SDO of the digital signal processor 10, the left audio device 15, or the right audio device 20 to which the command processor 40 is connected. So if the digital signal processor 10, the left audio device 15, or the right audio device 20 are connected to the command processor 40, digital signal processor 10, the left audio device 15, or the right audio device 20 can address any of the other devices connected to its serial data output SDO as a receiver. Further, the digital signal processor 10, and the left audio device 15, the right audio device 20 each has a receiver connected to a serial data input SDI that is connected to the serial data interface 25. This enables each of the digital signal processor 10, the left audio device 15, or the right audio device 20 to communicate with the other devices within the data communications system. As described above, the keyword packets, the command packets, the optional address packets, and the optional data packets may have cyclic redundancy check codes appended to the packets. The receiver of each of the digital signal processor 10, the left audio device 15, or the right audio device 20 verifies that the cyclic redundancy check codes are correct. If there is only a single serial data line within the serial data communications interface 25, the receiving device may ignore the keyword packets, the command packets, the optional address packets, or the optional data packets in error and proceed unless a number of the packets are in error and then the command will be terminated and an error declared and displayed for the user. Alternately, with the two serial data lines, as shown, the receiving device may send a negative acknowledgment (NACK) indicating that the message was in error and should be retransmitted.

Figure 6A:
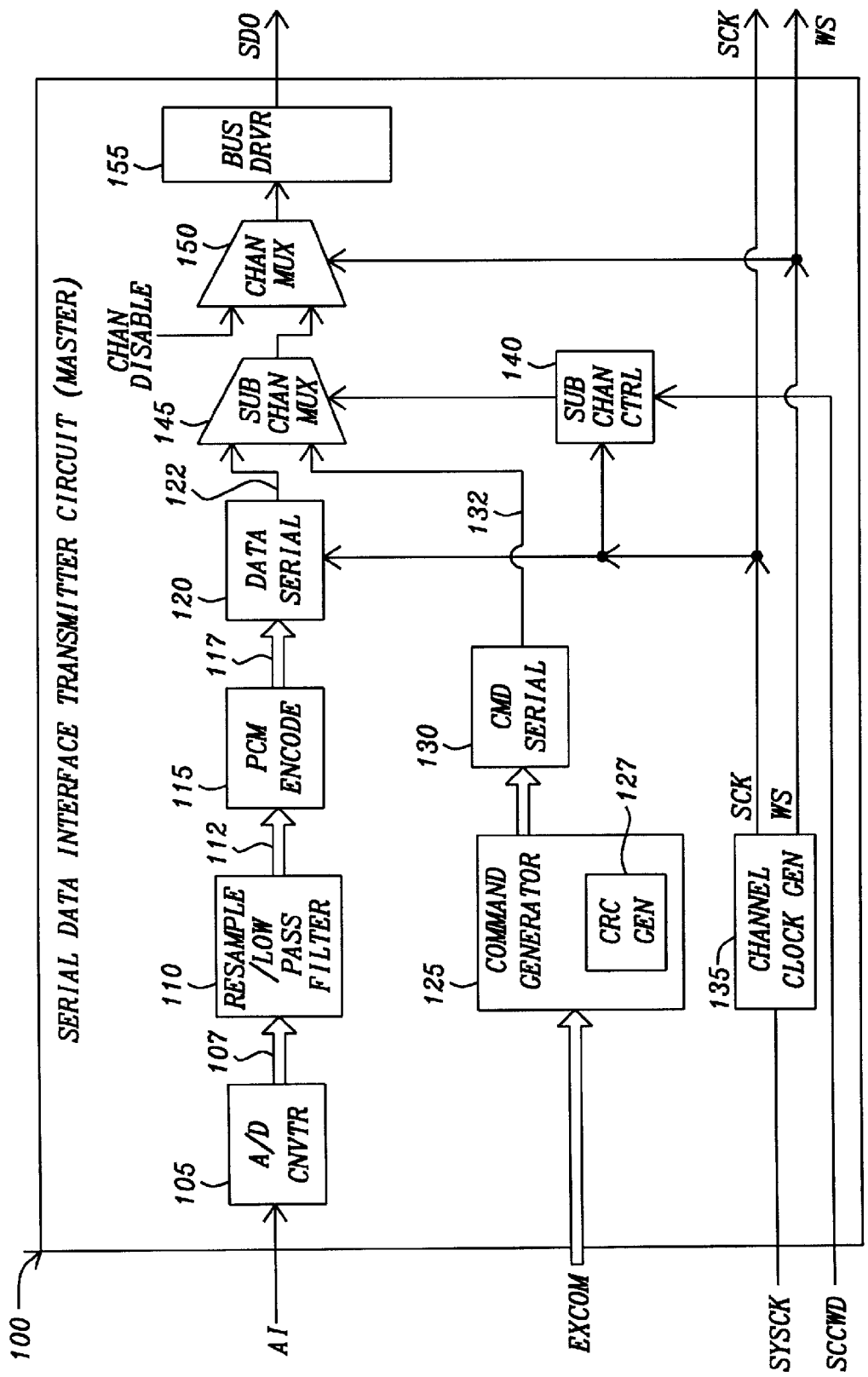
FIGS. 6a-6b are block diagrams of a serial data interface transmitter of this disclosure.
Figure 6B:
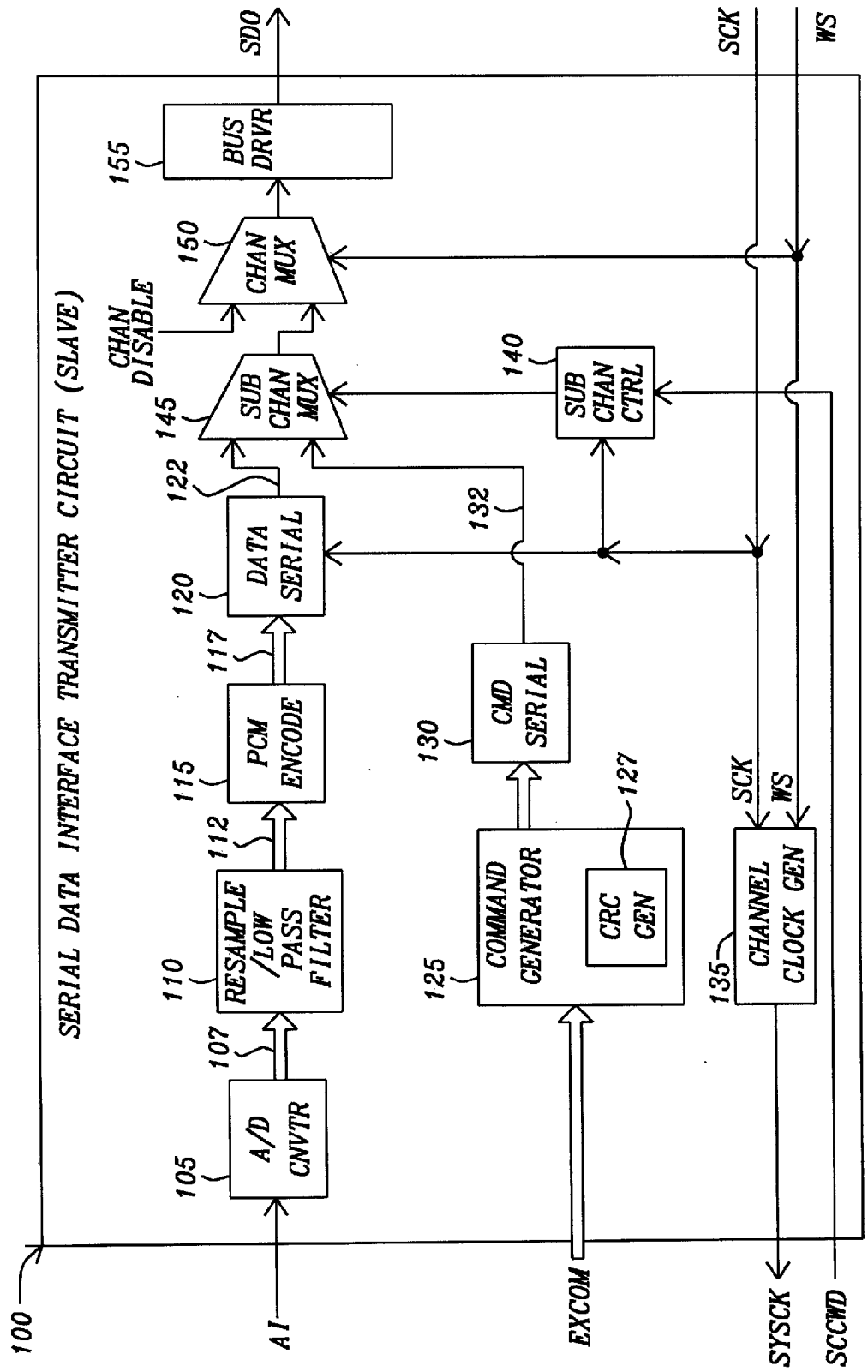

FIGS. 6a-6b are block diagrams of a serial data interface transmitter 100 that is included in each of the digital signal processor 10, the left audio device 15, or the right audio device 20 of FIGS. 5a-5d. The location of the serial data interface transmitter 100 is dependent upon the location of the command processor 40. Referring to FIG. 6a, an analog audio input signal AI is the input to an analog-to-digital converter 105 to sample and digitize the analog audio input signal AI. The sampled digitized analog signal 107 is then input to a resampling circuit and low pass filter 110 to further condition the digitized analog signal 107. The resampled and filter digitized analog signal 112 is the input to a PCM encoder 115. The PCM encoder 115 translates the resampled and filtered digitized analog signal 112 to a PCM code indicating an amplitude of each of the samples of the analog audio input signal AI. The PCM code 117 is the input to a data serializer 120 that converts the parallel bit structure of the PCM code 117 to the serial digitized analog signal 122. The serial digitized analog signal 122 is the input to a sub-channel multiplexer 145. If there is no command to be transmitted, the output of the sub-channel multiplexer 145 is the PCM encoded digitized analog signal that is the input to the channel multiplexer 150.

The serial data interface transmitter 100 is designated to be a master device and includes a channel clock generator 135. The channel clock generator 135 receives a system clock SYSCK that is used as a reference for generating the serial bit clock SCK and the word select clock WS. The serial bit clock is the timing input for the data serializer 120 that is used in serializing the PCM code 117. The word select clock WS is the input to the channel multiplexer. Depending on whether the transmitter is designated to be a left or right channel of the serial data protocol such as the I$^2$S, the word select clock WS enables transmission of the serial digitized analog signal through the channel multiplexer 150 or disables the channel. If the channel is enabled, the serial digitized analog signal is the input to the bus driver 155 that is transmitted to the serial data output line SDO. With the serial data interface transmitter 100 being a included in a master device, the bit serial clock SCK and the word select clock WS are transmitted to the serial data interface 25 of FIGS. 5a-5d.

If a user of the data communication system desires to adjust a performance factor of one of the transducers (microphone or loudspeaker) connected to the data communication system, an execute command signal EXCOM is sent to the command generator 125. The command generator 125 generates the keyword packets, command packets, optional address packets, and optional data packets based on the type of command sent by the execute command signal EXCOM. The keyword packets, command packets, optional address packets, and optional data packets are the input to the command serializer 130. The command serializer 130 converts the parallel versions of the keyword packets, command packets, optional address packets, and optional data packets to the serial command data 132 that is a second input to the sub-channel multiplexer 145.

In various embodiments, the command generator 125 includes a cyclic redundancy check code generator 127. The cyclic redundancy check code generator 127 produces a cyclic redundancy check code for the keyword packets, command packets, optional address packets, and optional data packets and appends the cyclic redundancy check code to the keyword packets, command packets, optional address packets, and optional data packets for transmission.

A sub-channel control word SCCWD provides an instruction code word to the sub-channel control circuit 140. The instruction code word indicates the truncation length of the serial digitized analog signal 122 and the location within the allocated command time domain channel that the keyword packets, command packets, optional address packets, and optional data packets are to be placed during the transmission. The output of the sub-channel control circuit 140 is the control signal for selecting the serial digitized analog signal for transmission, then truncating the digitized analog signal, and selecting the keyword packets, command packets, optional address packets, or optional data packets for transmission.

Referring to FIG. 6b, the serial data interface transmitter 100 is now a slave device. The channel clock generating circuit 135 now receives the serial bit clock SCK and the word select clock WS and conditions the system clock SYSCK for synchronization to the serial bit clock SCK and/or the word select clock WS. The serial bit clock SCK is the timing input for the sub-channel control 140 and the data serializer 120. The word select clock WS is the timing input for the channel multiplexer 150. The structure and function of the serial data interface transmitter 100 of FIG. 6b is otherwise identical to that of FIG. 6a.

Figure 7A:
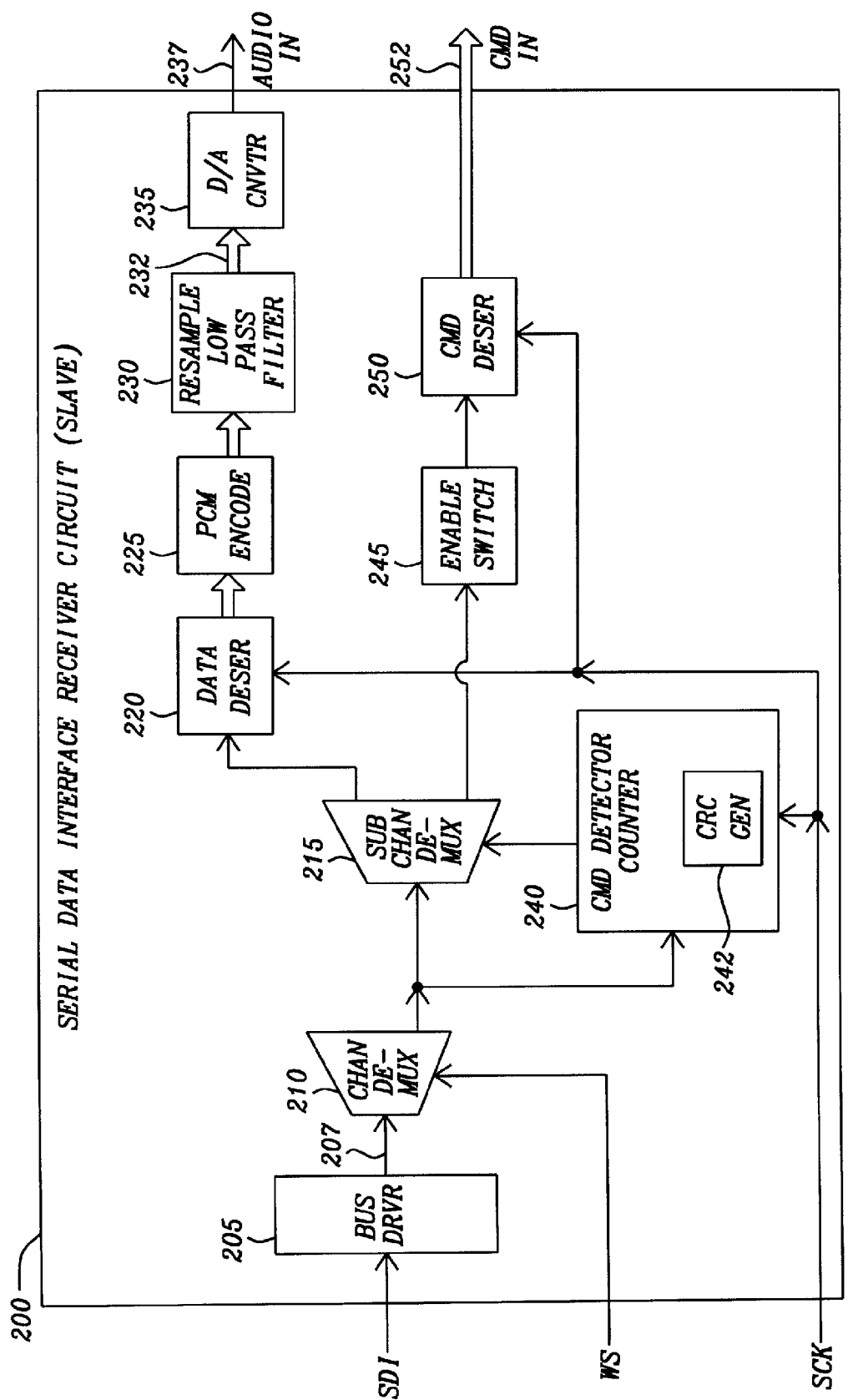
FIGS. 7a-7b are block diagrams of a serial data interface receiver of this disclosure.
Figure 7B:
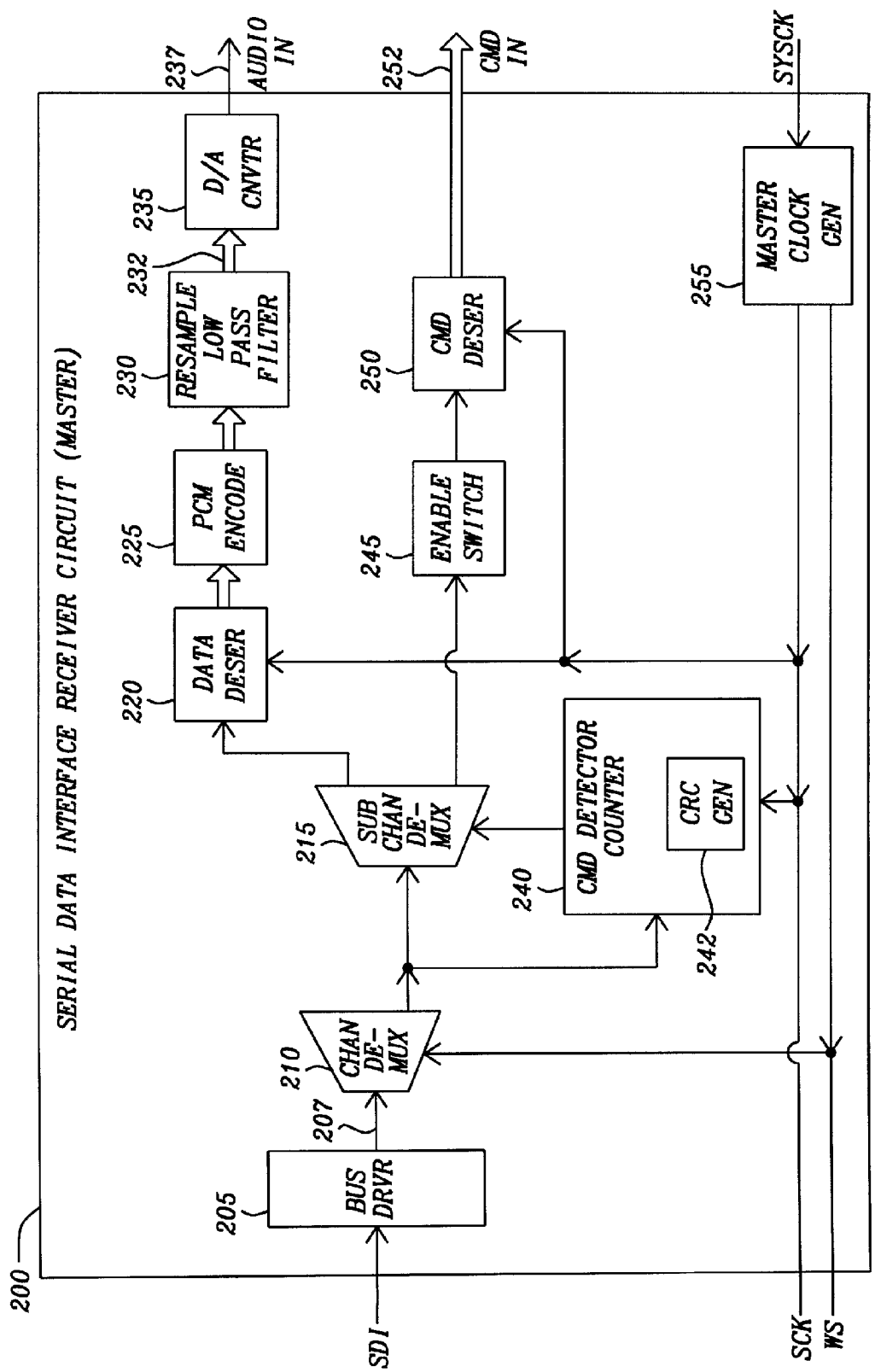

FIGS. 7a-7b are block diagrams of a serial data interface receiver 200 of this disclosure that is included in each of the digital signal processor 10, the left audio device 15, or the right audio device 20 of FIGS. 5a-5d. The serial data interface receiver 200 has a bus receiver 205 connected the serial data input port SDI to receive and condition the transmitted serial digitized analog signal. The conditioned serial digitized analog signal is transferred on the output 207 of bus receiver 205 to the channel demultiplexer 210. The serial data interface receiver 200 of this embodiment is a slave device and receives the serial bit clock SCK and the word select clock WS generated by the master device. The channel clock generating circuit 135 receives the serial bit clock SCK and the word select clock WS and conditions the system clock SYSCK for synchronization to the serial bit clock SCK and/or the word select clock WS.

The word select clock WS is the input to the channel demultiplexer 210. Based on the channel designation of the serial data interface receiver 200, the channel demultiplexer 210 selected frame of the serial digitized analog signal for transfer to the sub-channel demultiplexer 215. The selected frame of the serial digitized analog signal is also transferred to the command detector counter 240. The command detector counter 240 examines each selected frame of the digitized analog signal to determine if a keyword packet is present. If the keyword packet is not present, the command detector counter 240 activates the sub-channel demultiplexer to steer the entire serial digitized analog signal word to the data deserializer 220 where the serial digitized analog signal word is restored to a parallel PCM code of the digitized analog signal. The PCM code is transferred to the PCM decoder 225 to be restored to the digitized analog signal that is the appropriate input for a digital-to-analog converter. The restored digitized analog signal is the input to the resampling and low pass filter circuit 230 for resampling and low pass filtering. The resampled and filter digitized analog signal at the output of the resampling and low pass filter circuit 230 is the input to the digital-to-analog converter 235 for conversion to a reproduction of the original analog signal. The reproduction of the original analog signal is applied to the audio input for transfer to an external circuit or to a transducer such as loudspeaker for reproduction.

If the keyword packet is present, the command detector counter 240 activates the sub-channel demultiplexer 215 to extract the truncated serial digitized analog signal word and append zeros (0's) to complete the serial digitized analog signal word. The truncated serial digitized analog signal with the appended zeros is transferred to the data deserializer 220 where the truncated serial digitized analog signal word with the appended zeros is restored to a parallel PCM code of an attenuated version of the original digitized analog signal. The PCM code is transferred to the PCM decoder 225 to be restored as an attenuated version of the digitized analog signal that is the appropriate input for a digital-to-analog converter. The restored attenuated digitized analog signal is the input to the resampling and low pass filter circuit 230 for resampling and low pass filtering. The resampled and filter digitized analog signal at the output of the resampling and low pass filter circuit 230 is the input to the digital-to-analog converter 235 for conversion to an attenuated reproduction of the original analog signal. The attenuated reproduction of the original analog signal is applied to the audio output 237 for transfer to an external circuit or to a transducer such as loudspeaker for reproduction.

At this same time, the command detector counter 240 counts the keyword packet. This process continues until the number of keyword packets that are to be transferred are counted. Upon receipt of the total number of keyword packets, the enable switch 245 is activated. The command detector counter 240 activates the sub-channel demultiplexer 215 to extract the command packet and transfer command packet to the enable switch 245 to transfer the command packet to the command deserializer 250. The command deserializer 250 converts the serial command packet to a command word based on the timing of the serial bit clock SCK. The command word is transferred on the command input bus 252 to a command interpreter within the receiving device for execution.

If the command packet requires an address packet, the command detector counter 240 activates the sub-channel demultiplexer 215 to extract the address packet and transfer address packet to the enable switch 245. The enable switch 245 is activated by the command detector counter 240 to transfer the address packet to the command deserializer 250. The command deserializer 250 converts the serial address packet to an address word based on the timing of the serial bit clock SCK. The address word is transferred to the command input bus 252 to the command interpreter within the receiving device for execution.

If the command packet requires a data packet, the command detector counter 240 activates the sub-channel demultiplexer 215 to extract the data packet and transfer data packet to the enable switch 245. The enable switch 245 is activated by the command detector counter 240 to transfer the data packet to the command deserializer 250. The command deserializer 250 converts the serial data packet to a data word based on the timing of the serial bit clock SCK. The data word is transferred the command word, the address word, and the data on the command input bus 252 to the command interpreter within the receiving device for execution.

If the keyword packet, the command packet, optional address packet, and the optional data packet have a cyclic redundancy check code, the cyclic redundancy check circuit 242 within the command detector counter 240 examines the cyclic redundancy check code to verify that no error has occurred in the transmission. If cyclic redundancy check fails, the command packet, the address packet, or the data packet is discarded and the command packet, the address packet, or the data packet is counted. In the extreme, the operation is aborted, an error is declared with an error indicator activated, and the digitized analog receiving device is halted. The slave devices as shown in FIGS. 5a-5d have a serial data interface transmitter 100 of FIGS. 6a-6b. In the embodiments where the slave devices have a serial data interface transmitter 100 in addition to the serial data interface receiver 200, the serial data interface transmitter 100 transmits an error message to the control device requesting a retransmission of the command packet, the address packet, or the data packet.

Referring to FIG. 7b, the serial data interface receiver 200 is incorporated in a master device. The structure and function is described as in FIG. 7a, except that the serial bit clock SCK and the word select clock WS originate from a master clock generator 255. The master clock generator 255 generates the serial bit clock SCK and the word select clock WS from the system clock SYSCK. The serial bit clock SCK is transferred to the command detector counter 240, the data deserializer 220, and the command deserializer 250. The word select clock WS is transferred to the channel demultiplexer 210 for extracting the correct serial digitized analog signal from the serial data input SDI. The serial bit clock SCK and the word select clock WS are applied to the output terminals for transfer to the slave devices of the analog communications system.

Figure 8A:
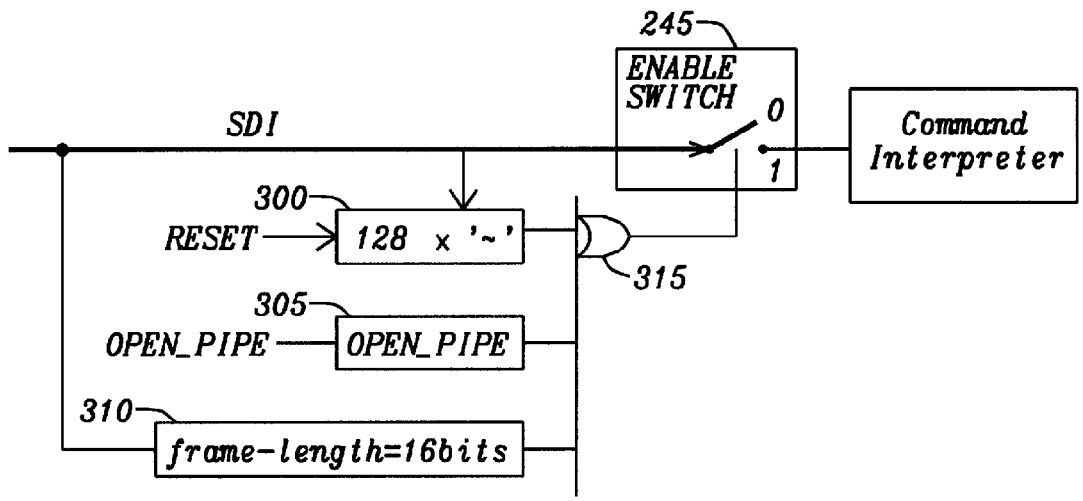
FIG. 8a is a block diagram of a keyword packet detection circuit within the receiver of this disclosure.

FIG. 8a is a block diagram of a keyword packet detection circuit within the command detector counter 240 of FIG. 7a or 7b. The extracted serial data input SDI is from the channel demultiplexer 210 of FIG. 7a or 7b is an input to the enable switch 245. The enable switch 245 is activated by three activities. The first is the receipt of the keyword packet by the keyword packet counter 300 for the required number of iterations (128 iterations in this embodiment). The second is receipt of a discrete open pipe command. The third is by a frame-length command.

The keyword packet counter 300 compares the received keyword packet with a desired keyword packet and increments a counter with each successful receipt of the keyword packet. When the counter indicates that the number (128) of the keyword packets are successfully received, the keyword packet counter 300 activates its output. The output of the keyword packet counter 300 is the input to the selector circuit 315. In this embodiment, the selector circuit 315 is an OR circuit that when an input is activated, its output signal enables the enable switch 245 to allow the serial data input SDI to communicate with the command interpreter 325 to open the programming pipe. In the embodiments of FIGS. 7a-7b, the serial command packet is deserialized to a command word for transfer to the command word. When the command interpreter 325 has completed execution of the received command, a reset signal is sent to the keyword packet counter 300 to reset the counter.

An open-pipe circuit 305 receives an open pipe command. This discrete command causes the open-pipe circuit 305 to activate the enable switch 245 to allow the serial data input SDI to communicate with the command interpreter 325.

If the frame length is of the audio stream is too short (i.e. 16 bits (8 bits for left and 8 bits for right), audio quality is too poor to support simultaneous transmission of the audio data and the command data simultaneous. When the keyword packet is detected, the received data stream to interpreted as command data only and contains no audio. The frame-length circuit 310 monitors the frame length of each audio data stream transmission present on the serial data input SDI. When the frame length is determined to be too short and the keyword packet is received, the frame-length circuit 310 activates the enable switch 245 to allow the serial data input SDI to communicate with the command interpreter 325.

Figure 8B:
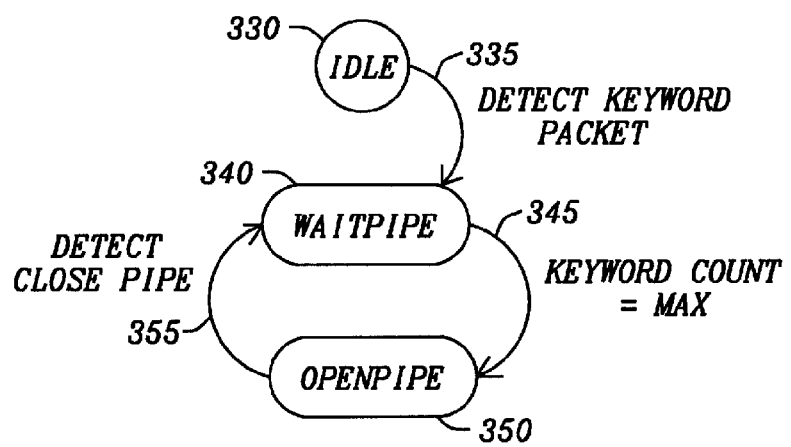
FIG. 8b is a state diagram for a state machine for detecting a keyword packet within a serial digitized analog data interface receiver of this disclosure.

FIG. 8b is a state diagram for a state machine for detecting a keyword packet within the command detector counter 240 of FIG. 7a or 7b. In embodiments, where the keyword packet detection circuit is a state machine, the initial state is an idle state 330. Upon detection of a keyword symbol packet, the state machine is transferred 335 to the wait pipe state 340. In the wait pipe state 340, each of the keyword packets received is counted until the keyword count is equal to a max keyword count. Upon reaching the maximum keyword count, the state is transferred 345 to the open pipe state 350. The command word, the optional address word, and the optional data word are transferred to the command interpreter for execution. At the completion of the execution of the command, the command interpreter transmits a close pipe command and the command pipe transfers 355 the state back to the idle state 330 to detect a byte or a nibble to determine how to count and check for the keyword packet.

Figure 9:
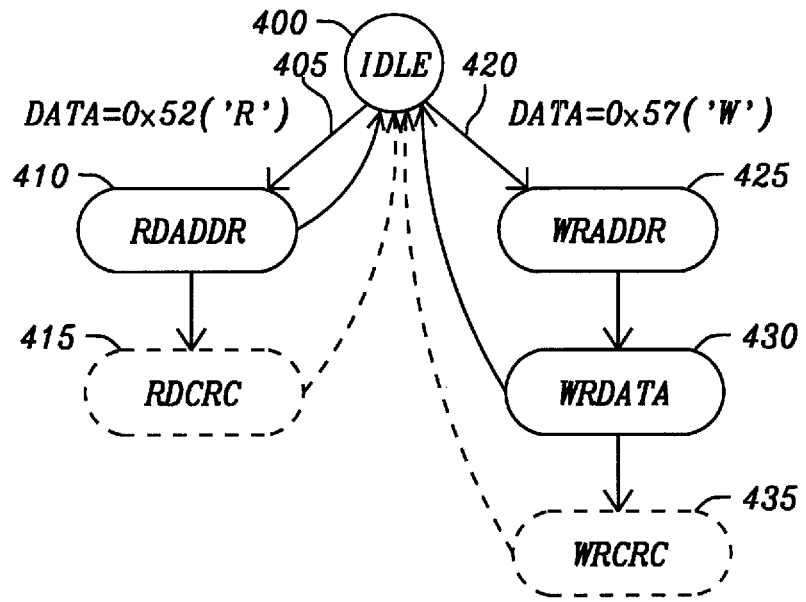
FIG. 9 is a state diagram for state machine for decoding a read or a write command within a command interpreter within a digitized analog device of a data communication system of this disclosure.

FIG. 9 is a state diagram for state machine for decoding a read or a write command within a command interpreter within an audio device of a data communication system of this disclosure. In various embodiments, the commands will be a write data to processor memory, a read data from processor memory. Additionally, coefficients for a digital signal processor within the audio device maybe transmitted to the command interpreter. In some embodiments, the commands are for a write operation using a hexadecimal value (0x57) for the ASCII code of a letter 'W', a read operation using a hexadecimal value (0x52) for the ASCII code of a letter 'R' and a address/data transfer of digital signal processing coefficients using a hexadecimal value (0x43) for the ASCII code of a letter 'C'. In other embodiments, other commands could be implemented including a power on/off instruction, a restart/reset instruction. Any command types that are executable by an included processor may be transferred using the protocol described above in FIG. 3. The command interpreter is in an idle state 400 until a command word is received. The command is interpreted and if the command data received is a hexadecimal value 0X52 for the ASCII code of the letter 'R', the command is a read operation. The state is transferred 405 to the read address state 410 and the next data arriving from the serial data interface receiver 200 is the address that is to be read. The address is transferred in the read address state 410 to the command interpreter. At the completion of the decoding of the read operation the state is transferred back to the idle state 400 and the command interpreter reads the data.

The state machine for decoding a read or a write command is in an idle state 400 until a command word is again received. The command is interpreted and if the command data received is a hexadecimal value 0X57 for the ASCII code of the letter 'W', the command is a write operation. The state machine is transferred 420 to the write address state 425 and the next data arriving from the serial data interface receiver 200 is the address that is to be written. The state machine is transferred to the write address state 425 and the next data arriving from the serial data interface receiver 200 is the data that is to be written to the address. The address and data is transferred in the write data state 430 to the command interpreter. At the completion of the decoding of the write operation the state is transferred back to the idle state 400 and the command interpreter reads the data.

In various embodiments, the cyclic redundancy check operation is not accomplished in the cyclic redundancy check circuit 242 within the command detector counter 240 of FIG. 7a or 7b. The cyclic redundancy check operation is accomplished in the state machine for decoding a read or a write command. In the read operation, after the address is read, the state transferred to the read cyclic redundancy code state 415. The read cyclic redundancy code is the next data arriving from the serial data interface receiver 200. The cyclic redundancy code is received and checked. If the cyclic redundancy code is verified, the state is transferred back to the idle state 400 and the command interpreter reads the data. If the cyclic redundancy code is fails verification, the command packet and the address packet is discarded. The command interpreter may then abort the operation and command interpreter may instruct the serial data interface receiver 200 to transfer other instances of the read address to the command interpreter. In some embodiments, where the receiving device is accompanied with a second transmitting device, command interpreter instructs the receiving device to transmit an error message to the first transmitting device requesting a retransmission of the read command packet and the address packet.

In the write operation, after the address and the data are read, the state transferred to the read cyclic redundancy code state 425. The write cyclic redundancy code is the next data arriving for the address and data from the serial data interface receiver 200. The cyclic redundancy code is received and checked for both the address and the data. If the cyclic redundancy code is verified, the state is transferred back to the idle state 400 and the command interpreter writes the data to the address. If the cyclic redundancy code is fails verification, the command packet, the address packet, and the data are discarded. The command interpreter may then abort the operation and command interpreter may instruct the serial data interface receiver 200 to transfer other instances of the write address and write data to the command interpreter. In some embodiments, where the receiving device is accompanied with a second transmitting device, command interpreter instructs the receiving device to transmit an error message to the first transmitting device requesting a retransmission of the write command packet, the address packet, and the data packet.

Figure 10:
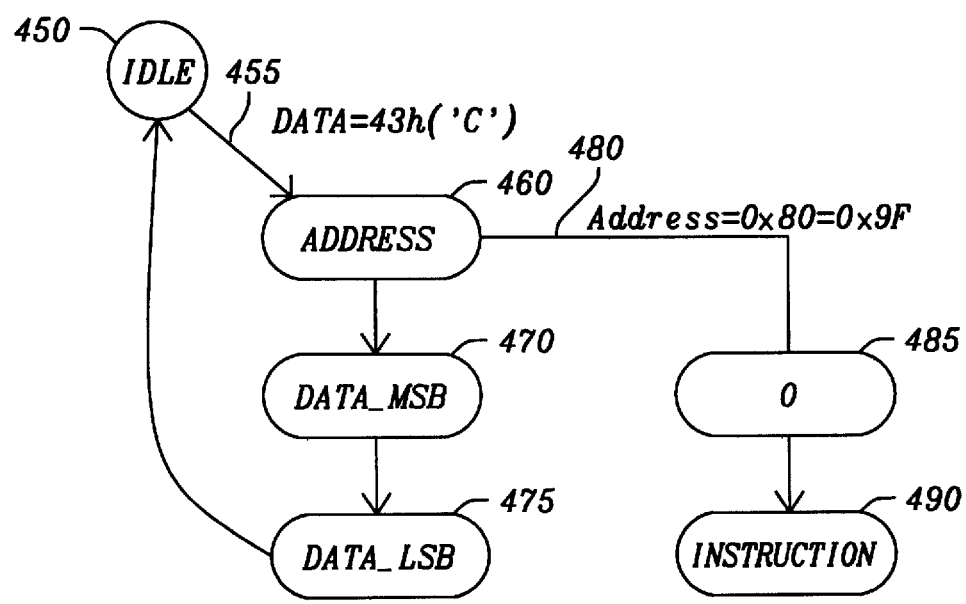
FIG. 10 is a state diagram for a state machine for writing digital signal processing coefficients to a memory address of a digital signal processor within a serial digitized analog interface receiver of this disclosure.

FIG. 10 is a state diagram for a state machine within the command interpreter for writing digital signal processing instructions and coefficients to a memory address of a digital signal processor within a serial data interface receiver of this disclosure. The state machine is in the idle state 450 until the command interpreter receives a digital signal processor word using a hexadecimal value (0x43) for the ASCII code of a letter 'C'. Upon receiving the digital signal processor coefficient command, the state is transferred 455 to the read address state 460 to read the address that is to be written. If the read address is determined be within a data range (0-0x1f) the state is transferred 465 to the write most significant byte state 470 to write the received coefficient data to the address specified. The state is then transferred to the write least significant byte state 475 to write the received coefficient data to the address specified. At the completion of the writing of the coefficient data, the state is returned to the idle state 450 waiting for another write the digital signal processor memory.

When the command interpreter receives the digital signal processor word, the state is again transferred 455 to the read address state 460. The address is received by the command interpreter and examined for its range. If the range is in the instruction range (0X80-0X9F), the state machine is placed in an instruction truncation state 480. The digital signal processor in various embodiments has a longer word length than the length of the transmitted packet and therefore the most significant byte or bytes of the instruction must be truncated in the truncation state 480.

At the completion of the truncation state 480, the state machine is transferred to the instruction write state 485. The instruction word is received by the command interpreter and written to the instruction address. In the instruction write state 485, the device instructions are received from the serial data input SDI via the pipe and passed into the program memory of the onboard the digital signal processor of the device. At the completion of the instruction write state 485, the state machine is returned to the idle state 450.

Figure 11:
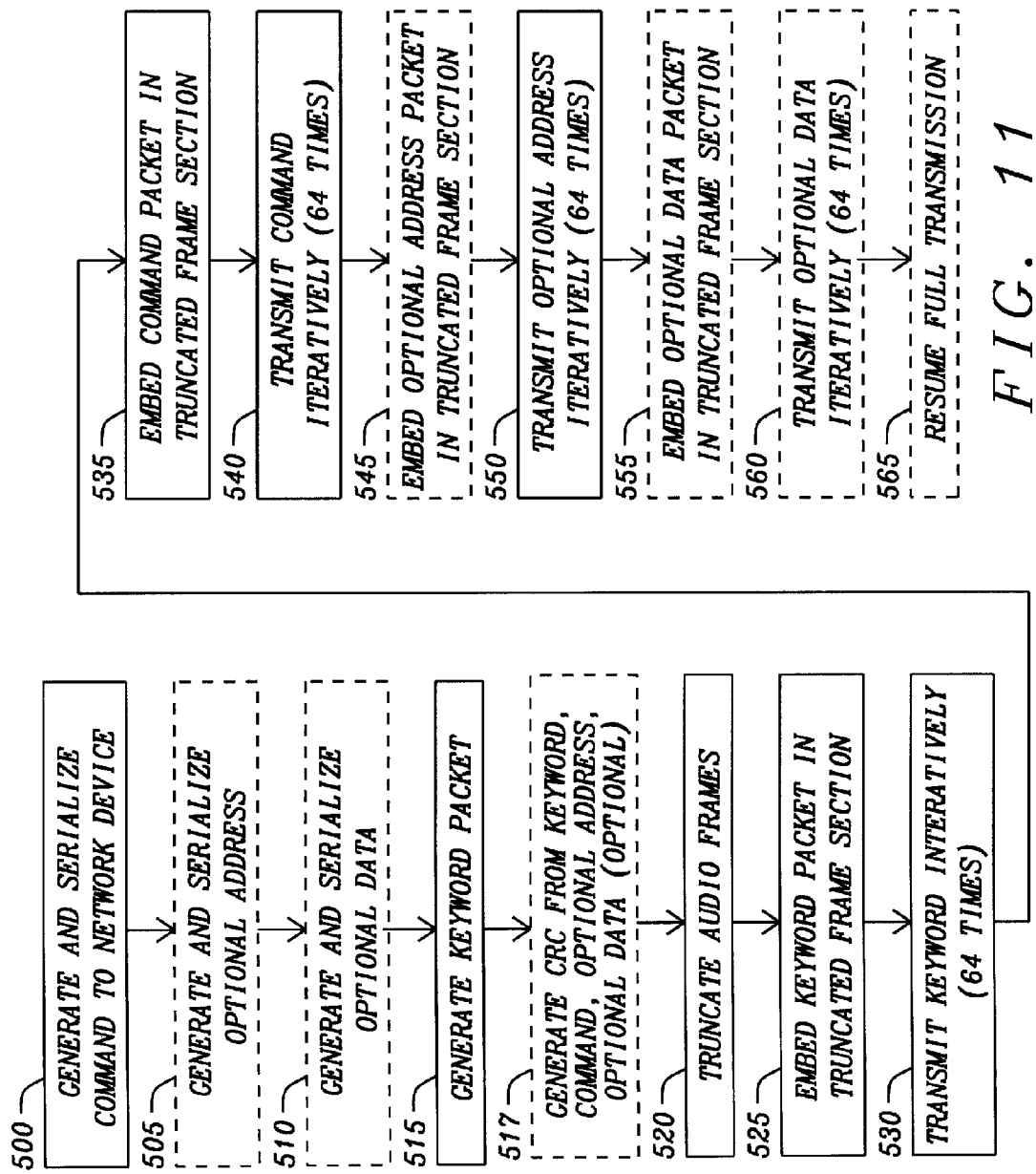
FIG. 11 is a flowchart of a method for transmitting command instructions from a command processor to a network device with a serial digitized analog communication protocol through a serial communication media.

FIG. 11 is a flowchart of a method for transmitting command instructions from a command processor to a network device with a serial digitized analog communication protocol through a serial communication media. A command packet is generated and serialized (Box 500) for transmission to at least one network device. If the command packet requires an address designating a location within a network device's memory, an optional memory address packet is generated and serialized (Box 505). If the command packet requires that data be transmitted in addition to the address packet designating a location within a network device's memory, an optional the data packet is generated and serialized (Box 510). The protocol as described above in FIGS. 4*a* and 4*b*, requires a keyword symbol to be transmitted prior to the transmission of the command packet, the optional address packet, and the optional data packet. The keyword packet is generated (Box 515). In various embodiments the keyword packet is the ASCII code for a tilde () or the hexadecimal code "7E". In various embodiments, a cyclic redundancy check code is generated and appended (Box 517) to the keyword packet, the command packet, the optional address packet, and the optional data packet.

A first number of serial digitized analog audio frames are truncated (Box 520) and the keyword packets are appended (Box 525) to the truncated sections of the serial digitized analog audio frames. The serial digitized analog audio frames with the appended keyword packet is transmitted iteratively (Box 530) such that the keyword packet is repeated for the number of times. In some embodiments, the number of iterations of the keyword packet is sixty-four (64) times.

A second number of serial digitized analog audio frames are truncated and the command packets are appended (Box 535) to the truncated section of the serial digitized analog audio frames. The serial digitized analog audio frames with the appended command packet is transmitted iteratively (Box 540) such that the command packet is repeated for the second number of times. As described for the keyword packet, the number of iterations of the command packet is sixty-four (64) times.

A third number of serial digitized analog audio frames are truncated and the optional address packets are appended (Box 545) to the truncated section of the serial digitized analog audio frames. The serial digitized analog audio frames with the appended optional address packet is transmitted iteratively (Box 550) such that the optional address packet is repeated for the third number of times. As described for the keyword and command packets, the number of iterations of the optional address packet is sixty-four (64) times.

A fourth number of serial digitized analog audio frames are truncated and the optional data packets are appended (Box 555) to the truncated section of the serial digitized analog audio frames. The serial digitized analog audio frames with the appended optional data packet is transmitted iteratively (Box 560) such that the optional data packet is repeated for the fourth number of times. As described for the keyword, command, and optional address packets, the number of iterations of the optional data packet is sixty-four (64) times.

At the completion of the transmission of the command packet with the optional address and data packets, the transmission (Box 565) of the full serial digitized analog audio frames resumes.

Figure 12B:
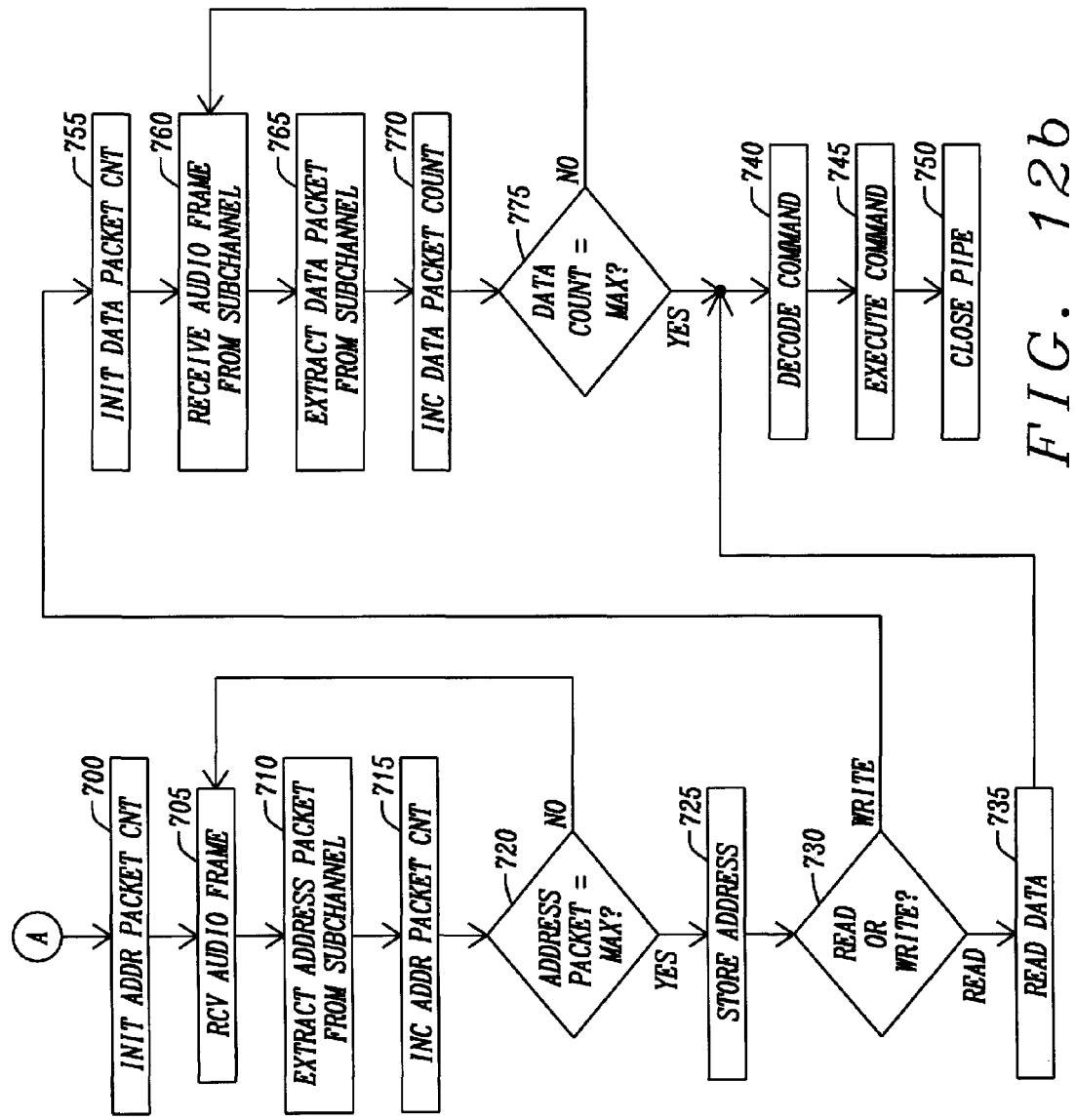

FIGS. 12*a*-12*b* are a flowchart of an embodiment of a method for receiving command instructions by a network device transmitted from a command processor with a serial digitized analog communication protocol through a serial communication media of this disclosure. A keyword packet counter is initialized (Box 600) and a serial digitized analog audio frame is received (Box 605). The audio frame is examined (Box 610) to determine if the keyword packet is received. If the keyword packet is not received, the successive serial digitized analog audio frame is received (Box 605) and the audio frame is examined (Box 610). When the keyword packet is detected, the keyword is extracted (Box 615) from the command sub-channel and the keyword packet count is incremented (Box 620). The keyword packet count is compared (Box 625) to a maximum packet count. If the maximum packet count is not achieved, the next serial digitized audio frame is received (Box 605), detected (Box 610), extracted (Box 615) from the command sub-channel, and the keyword packet count is incremented (Box 620). The keyword packet count is again compared (Box 625) to the maximum packet count.

When the keyword packet count is equal to the maximum packet count, the command programming pipe is opened (Box 630). The command packet count is initialized (Box 635) and the serial digitized analog audio frame is received (Box 640). The command packet is extracted (Box 645) from the command sub-channel of the received serial digitized analog audio frame. The command packet count is incremented (Box 650) and compared (Box 655) to the maximum packet count. If the maximum packet count is not achieved, the next serial digitized analog audio frame is received (Box 640), command packet extracted (Box 645) from the command sub-channel of the received serial digitized analog audio frame, and the command packet count is incremented (Box 650). The command packet count is again compared (Box 655) to the maximum packet count.

When the command packet count is equal to the maximum packet count, the command is decoded (Box 660) and it is determined (Box 665) if the command requires an address and/or data that is transmitted subsequently to the command packet. If the command does not require address and/or data, the command is executed (Box 670) and the command programming pipe is closed (Box 675)

Refer now to FIG. 12b. When the command requires an address, the address packet count is initialized (Box 700) and the serial digitized analog audio frame is received (Box 705). The address packet is extracted (Box 710) from the command sub-channel and the address packet count is incremented (Box 715). The address packet count is compared (Box 720) to a maximum packet count. If the maximum packet count is not achieved, the next serial digitized audio frame is received (Box 705), extracted (Box 710) from the command sub-channel, and the address packet count is incremented (Box 715). The address packet count is again compared (Box 720) to the maximum packet count.

When the address packet count is equal to the maximum packet count, the address is stored (Box 725) and the command is examined (Box 730) to determine if the command is a read operation or a write operation. In the write operation, the write not be just a simple write, but a write of coefficients for the digital signal processor of the receiving device. If the command operation is a read, the data within the resident memory of the device is read (Box 735), command with the read data is decoded (Box 740), and the command is executed (Box 745). The command programming pipe is then closed (Box 750).

If the command is determined (Box 730) to be a write operation, the data packet count is initialized (Box 755) and the serial digitized analog audio frame is received (Box 760). The data packet is extracted (Box 765) from the command sub-channel and the data packet count is incremented (Box 770). The data packet count is compared (Box 775) to a maximum packet count. If the maximum packet count is not achieved, the next serial digitized audio frame is received (Box 760), extracted (Box 765) from the command sub-channel, and the address packet count is incremented (Box 770). The data packet count is again compared (Box 775) to the maximum packet count. When the data packet count is equal to the maximum packet count, command with the received data is decoded (Box 740), and the command is executed (Box 745). The command programming pipe is then closed (Box 750).

Figure 13A:
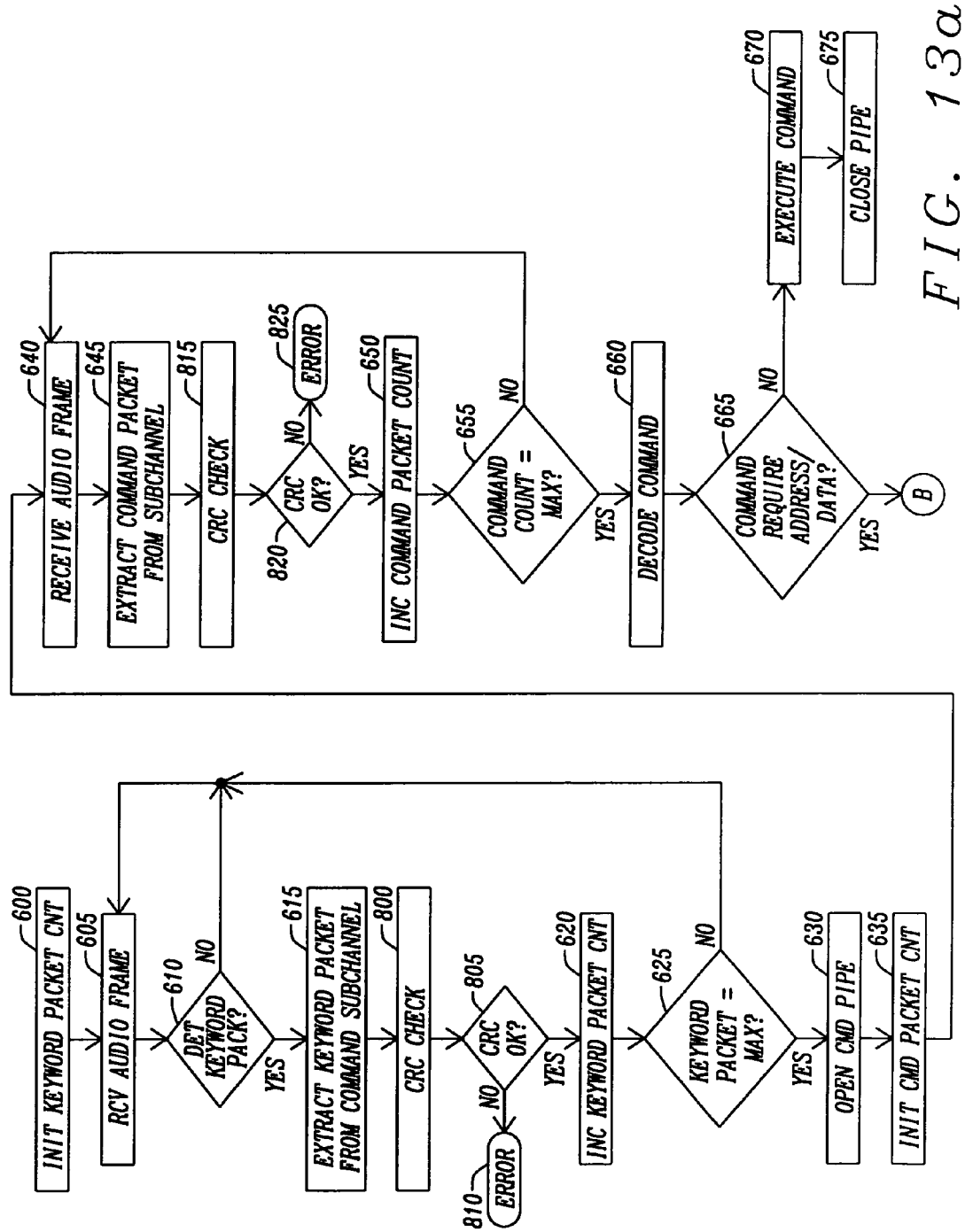
FIGS. 13a-13b are a flowchart of another embodiment of a method for receiving command instructions by a network device transmitted from a command processor with a serial digitized analog communication protocol through a serial communication media of this disclosure.
Figure 13B:
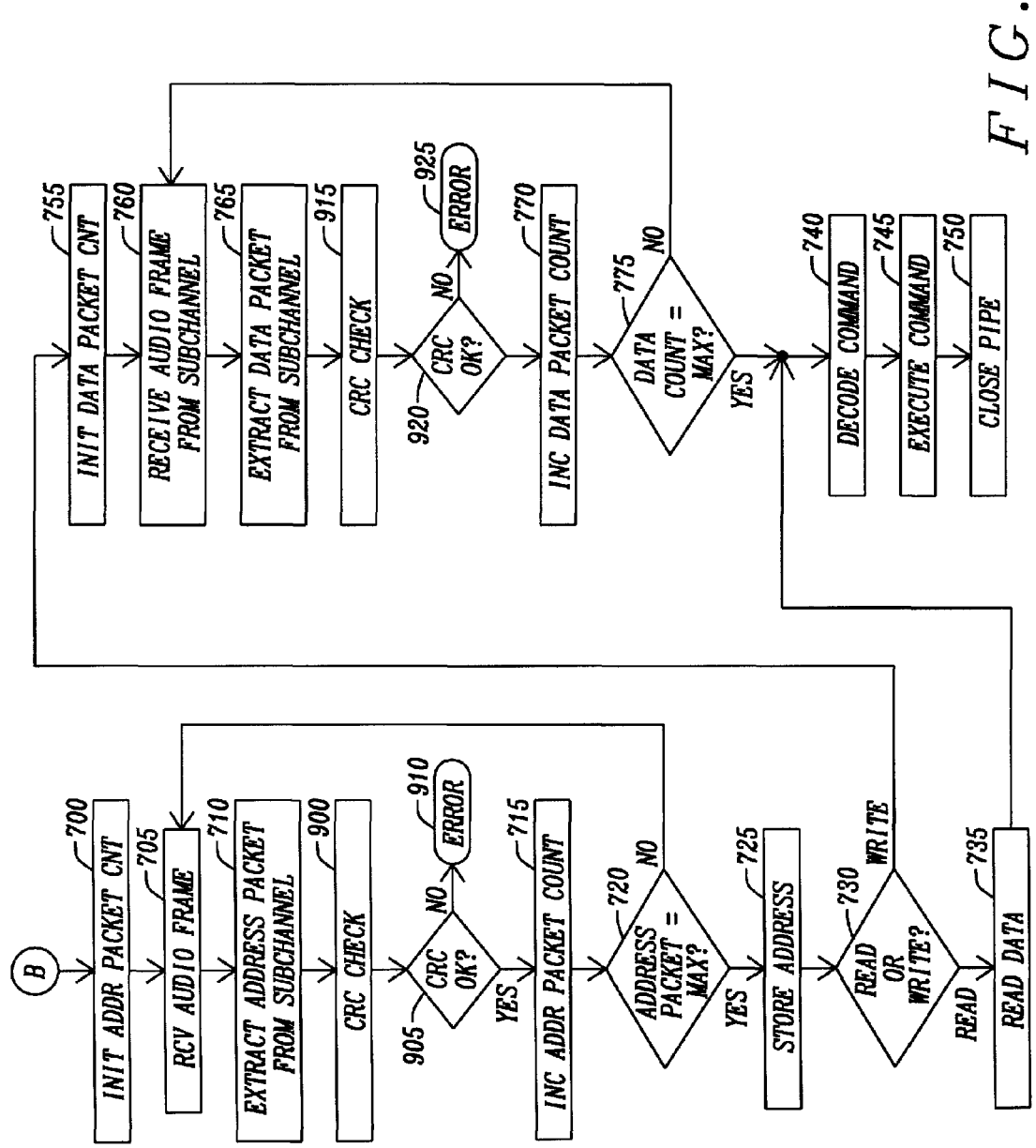

FIGS. 13a-13b are a flowchart of an embodiment of a method for receiving by a network device transmitted from a command processor with a serial digitized analog communication protocol through a serial communication media of this disclosure. The basic operations of this method is as described in FIGS. 12a-12b, in that a keyword packet counter is initialized (Box 600) and a serial digitized analog audio frame is received (Box 605). The audio frame is examined (Box 610) to determine if the keyword packet is received. If the keyword packet is not received, the successive serial digitized analog audio frame is received (Box 605) and the audio frame is examined (Box 610). When the keyword packet is detected, the keyword is extracted (Box 615) from the command sub-channel and the keyword packet count is incremented (Box 620).

When the keyword packet is detected, a cyclic redundancy code check operation is performed (Box 800). The results of the cyclic redundancy code check is examined (Box 805) to determine if the keyword packet is correct. If cyclic redundancy check of the keyword packet fails, and an error is declared (Box 810) and keyword may be counted. In the extreme, the operation is aborted and successive serial digitized analog audio frames are received (Box 605) and the audio frame is examined (Box 610). In some embodiments, where the receiving device is accompanied with a second transmitting device, the receiving device transmits an error message to the first transmitting device requesting a retransmission of the keyword packet.

If the cyclic redundancy check of the keyword packet is correct, the keyword packet count is compared (Box 625) to a maximum packet count. If the maximum packet count is not achieved, the next serial digitized audio frame is received (Box 605), detected (Box 610), extracted (Box 615) from the command sub-channel, the cyclic redundancy code of the keyword packet is examined (Box 800), and the keyword packet count is incremented (Box 620). The keyword packet count is again compared (Box 625) to the maximum packet count.

When the keyword packet count is equal to the maximum packet count, the command programming pipe is opened (Box 630). The command packet count is initialized (Box 635) and the serial digitized analog audio frame is received (Box 640). The command packet is extracted (Box 645) from the command sub-channel of the received serial digitized analog audio frame and a cyclic redundancy code check operation is performed (Box 815) on the cyclic redundancy code check of the command packet. The results of the cyclic redundancy code check is examined (Box 820) to determine if the command packet is correct. If cyclic redundancy check of the command packet fails, an error is declared (Box 825) command packet may be counted. In the extreme, the operation is aborted and a successive serial digitized analog audio frame is received (Box 605) and the audio frame is examined (Box 610). In some embodiments, where the receiving device is accompanied with a second transmitting device, the receiving device transmits an error message to the first transmitting device requesting a retransmission of the command packet.

If the cyclic redundancy check of the command packet is correct, the command packet count is incremented (Box 650) and compared (Box 655) to the maximum packet count. If the maximum packet count is not achieved, the next serial digitized analog audio frame is received (Box 640), command packet extracted (Box 645) from the command sub-channel of the received serial digitized analog audio frame, the cyclic redundancy code of the command packet is examined (Box 815), and the command packet count is incremented (Box 650). The command packet count is again compared (Box 655) to the maximum packet count.

When the command packet count is equal to the maximum packet count, the command is decoded (Box 660) and it is determined (Box 665) if the command requires an address and/or data that is transmitted subsequently to the command packet. If the command does not require address and/or data, the command is executed (Box 670) and the command programming pipe is closed (Box 675)

Refer now to FIG. 13b. As described in FIG. 12b, when the command requires an address, the address packet count is initialized (Box 700) and the serial digitized analog audio frame is received (Box 705). The address packet is extracted (Box 710) from the command sub-channel and a cyclic redundancy code check operation is performed (Box 900) on the cyclic redundancy code check of the address packet. The results of the cyclic redundancy code check is examined (Box 905) to determine if the address packet is correct. If cyclic redundancy check of the address packet fails, an error is declared (Box 910) and the address packet may be counted. In the extreme, the operation is aborted and a successive serial digitized analog audio frame is received (Box 605) and the audio frame is examined (Box 610). In some embodiments, where the receiving device is accompanied with a second transmitting device, the receiving device transmits an error message to the first transmitting device requesting a retransmission of the address packet.

If the cyclic redundancy check of the address packet is correct, and the address packet count is incremented (Box 715). The address packet count is compared (Box 720) to a maximum packet count. If the maximum packet count is not achieved, the next serial digitized audio frame is received (Box 705), extracted (Box 710) from the command sub-channel, the cyclic redundancy code of the address packet is examined (Box 900), and the address packet count is incremented (Box 715). The address packet count is again compared (Box 720) to the maximum packet count.

When the address packet count is equal to the maximum packet count, the address is stored (Box 725) and the command is examined (Box 730) to determine if the command is a read operation or a write operation. In the write operation, the write not be just a simple write, but a write of coefficients for the digital signal processor of the receiving device. If the command operation is a read, the data within the resident memory of the device is read (Box 735), command with the read data is decoded (Box 740), and the command is executed (Box 745). The command programming pipe is then closed (Box 750).

If the command is determined (Box 730) to be a write operation, the data packet count is initialized (Box 755) and the serial digitized analog audio frame is received (Box 760). The data packet is extracted (Box 765) from the command sub-channel and a cyclic redundancy code check operation is performed (Box 915) on the cyclic redundancy code check of the data packet. The results of the cyclic redundancy code check is examined (Box 920) to determine if the data packet is correct. If cyclic redundancy check of the data packet fails, an error is declared (Box 925) and the data packet may be counted. In the extreme, the operation is aborted and a successive serial digitized analog audio frame is received (Box 605) and the audio frame is examined (Box 610). In some embodiments, where the receiving device is accompanied with a second transmitting device, the receiving device transmits an error message to the first transmitting device requesting a retransmission of the data packet.

If the cyclic redundancy check of the data packet is correct, the data packet count is incremented (Box 770). The data packet count is compared (Box 775) to a maximum packet count. If the maximum packet count is not achieved, the next serial digitized audio frame is received (Box 760), extracted (Box 765) from the command sub-channel, and the data packet count is incremented (Box 770). The data packet count is again compared (Box 775) to the maximum packet count. When the data packet count is equal to the maximum packet count, command with the received data is decoded (Box 740), and the command is executed (Box 745). The command programming pipe is then closed (Box 750).

While this disclosure has been particularly shown and described with reference to the preferred embodiments thereof, it will be understood by those skilled in the art that various changes in form and details may be made without departing from the spirit and scope of the disclosure.

What is claimed is:

1. A method for controlling at least one digitized analog communication device from a control circuit communicating with the at least one digitized analog communication device with a serial digitized analog protocol over a network of a plurality of digitized analog communication devices, the method comprising the steps of:
   periodically sampling and digitizing an analog signal by one digitized analog communication device;
   placing the digitized analog signal into periodic frames by the one digitized analog communication device;
   serializing each frame of the digitized analog signal by the one digitized analog communication device;
   truncating at least one of each frame of the digitized analog signal at a least significant bit location of the at least one frame of the digitized analog signal to create a sub-channel within the at least one frame of the digitized analog signal by the one digitized analog communication device;
   multiplexing a command word received from the control circuit within the sub-channel of at least one of the periodic frames, wherein the command word comprises at least one keyword packet of a plurality of keyword packets followed by at least one command packet of a plurality of command packets;
   transmitting the truncated serial digitized signal with the command word multiplexed within the sub-channels of the frames over the network; and
   executing a command designated by the command word by at least one other digitized analog device iteratively receiving, extracting, and counting the command word based upon two or more receptions of the sub-channels of the frames.

2. The method of claim 1 wherein the command word further comprises a plurality of keyword packets that are transmitted iteratively within the sub-channels of a first number of frames of the truncated serial digitized analog signal.

3. The method of claim 2 wherein the command word further comprises a plurality of command packets that are transmitted iteratively within the sub-channels of a second number of frames of the truncated serial digitized analog signal.

4. The method of claim 3 wherein the command word further comprises a plurality of address packets that are transmitted iteratively within the sub-channels of a third number of frames of the truncated serial digitized analog signal.

5. The method of claim 4 wherein the command word further comprises a plurality of data packets that are transmitted iteratively within the sub-channels of a fourth number of frames of the truncated serial digitized analog signal.

6. The method of claim 5 wherein the first, second, third, and fourth numbers are sixty-four (64).

7. The method of claim 1 further comprising the step of appending a cyclic redundancy code to the command word.

8. The method of claim 3 wherein the step of executing the command of the command word by at least one other digitized analog device comprises the steps of:

receiving by the at least one other digitized analog communication device the first number of frames of the truncated serial digitized analog signal with the iteratively transmitted keyword packets of the command word within the sub-channel;

extracting the keyword packets from each sub-channel by the at least one other digitized analog communication device;

counting the keyword packets by the at least one other digitized analog communication device;

when the count of the keyword packets is the first number, receiving by the at least one other digitized communication analog device the second number of frames of the truncated serial digitized analog signal with the iteratively transmitted command packets of the command word within the sub-channel;

extracting the command packets from each sub-channel by the at least one other digitized analog communication device;

counting the command packets by the at least one other digitized analog communication device; and when the count of the command packets is the second number, executing the command by the at least one other digitized analog device.

9. The method of claim 4 wherein the step of executing the command of the command word by at least one other digitized analog device comprises the steps of:

receiving by the at least one other digitized analog communication device the first number of frames of the truncated serial digitized analog signal with the iteratively transmitted keyword packets of the command word within the sub-channel;

extracting the keyword packets from each sub-channel by the at least one other digitized analog communication device;

counting the keyword packets by the at least one other digitized analog communication device;

when the count of the keyword packets is the first number, receiving by the at least one other digitized analog communication device the second number of frames of the truncated serial digitized analog signal with the iteratively transmitted command packets of the command word within the sub-channel;

extracting the command packets from each sub-channel by the at least one other digitized analog communication device;

counting the command packets by the at least one other digitized analog communication device; and when the count of the command packets is the second number and the command requires an address of a memory location within the at least one other digitized analog communication device, receiving by the at least one other digitized analog communication device the third number of frames of the truncated serial digitized analog signal with the iteratively transmitted address packets of the command word within the sub-channel;

extracting the address packets from each sub-channel by the at least one other digitized analog communication device;

counting the address packets by the at least one other digitized analog communication device; and when the count of the address packets is the third number, executing the command with data present at the memory location by the at least one other digitized analog communication device.

10. The method of claim 5 wherein the step of executing the command of the command word by at least one other digitized analog device comprises the steps of:

receiving by the at least one other digitized analog communication device the first number of frames of the truncated serial digitized analog signal with the iteratively transmitted keyword packets of the command word within the sub-channel;

extracting the keyword packets from each sub-channel by the at least one other digitized analog communication device;

counting the keyword packets by the at least one other digitized analog communication device;

when the count of the keyword packets is the first number, receiving by the at least one other digitized analog communication device the second number of frames of the truncated serial digitized analog signal with the iteratively transmitted command packets of the command word within the sub-channel;

extracting the command packets from each sub-channel by the at least one other digitized analog communication device;

counting the command packets by the at least one other digitized analog communication device; and when the count of the command packets is the second number and the command requires an address of a memory location within the by the at least one other digitized analog communication device and data to be stored within the address of the memory location, receiving by the by the at least one other digitized analog communication device the third number of frames of the truncated serial digitized analog signal with the iteratively transmitted address packets of the command word within the sub-channel;

extracting the address packets from each sub-channel by the at least one other digitized analog communication device;

counting the address packets by the at least one other digitized analog communication device;

when the count of the address packets is the third number, receiving by the by the at least one other digitized analog communication device the fourth number of frames of the truncated serial digitized analog signal with the iteratively transmitted data packets of the command word within the sub-channel;

when the count of the data packets is the fourth number, storing by the at least one other digitized analog communication device the data to the memory location designated by the address and executing the command with data present at the designated memory location by the digitized analog device.

11. The method of claim 7 further comprising the steps of:
receiving by the by the at least one other digitized analog communication device the frames of the truncated serial digitized analog signal with the iteratively transmitted packets of the command word within the sub-channels of the frames;
extracting the packets from each sub-channel;
checking the cyclic redundancy code of each of the packets; and
when the cyclic redundancy code of any packets of the iterations of the command word fail, declaring an error within the command word.

12. The method of claim 11 further comprising the step of terminating by the at least one other digitized analog communication device the command word and activating an indicator that an error has occurred and the command cannot be executed.

13. The method of claim 11 further comprising the step of terminating by the at least one other digitized analog communication device the command word, transmitting a negative acknowledgement of receipt of the command word and requesting retransmission of the command word.

14. The method of claim 1 wherein in the digitized analog signal is pulse coded modulated digital data.

15. The method of claim 14 wherein in the digitized analog signal is a digital audio signal.

16. The method of claim 15 wherein the at least one digitized analog communication device comprises a loudspeaker for reproducing a digital-to-analog converted signal that is converted from the digital audio signal.

17. A control device for controlling operation of a digitized analog communication device through a communication media with a serial digitized analog protocol comprising:
a serial digitized analog protocol generator that receives sampled digitized analog data, divides the sampled digitized analog data into frames, serializes each frame of the digitized analog data, and generates a time domain channel into which each frame of the sampled analog data is to be transmitted;
a command generator for generating a command word that is to be executed by a receiving digitized analog communication device, wherein the command word comprises at least one keyword packet of a plurality of keyword packets followed by at least one command packet of a plurality of command packets;
a sub-channel control circuit that selects a sub-channel of the time domain channel into which the command word is to be inserted; and
a sub-channel multiplexer in communication with the command generator and the sub-channel control circuit for selecting the frame of the sampled digitized analog signal for transmission and truncating the sampled digitized analog signal at a least significant bit location of the at least one frame of the digitized analog signal to insert the command word at selected sub-channel for transmission such that the receiving digitized analog communication device executes the command of the command word after having iteratively received, extracted, and counted the command word based upon two or more receptions of the sub-channels of the frames.

18. The control device for controlling operation of a digitized analog communication device of claim 17 wherein the command generator comprises:
a keyword generator for creating a keyword packet for indicating a command word is being transmitted to the digitized analog device; and
a command serializing circuit for serializing the keyword packet and the command word for transmission to the sub-channel multiplexer for insertion to the sub-channel of the time domain channel for appending to the truncated digitized analog data of a selected frame.

19. The control device for controlling operation of a digitized analog communication device of claim 18 wherein the sub-channel multiplexer truncates the digitized analog signal thus reducing the amplitude of a reproduced analog signal based on the location of the selected sub-channel.

20. The control device for controlling operation of a digitized analog communication device of claim 19 wherein the keyword generator creates a first number of copies of the keyword packet to be transmitted iteratively in sub-channels of multiple successive frames of the digitized analog data such that the receiving digitized analog communication device executes the command of the command word after iteratively receiving, extracting, and counting the command word.

21. The control device for controlling operation of a digitized analog communication device of claim 20 wherein the command generator creates a second number of copies of the command packet to be transmitted iteratively in sub-channels of multiple successive frames of the digitized analog data after the iterative transmission of the first number of copies of the keyword packet.

22. The control device for controlling operation of a digitized analog communication device of claim 21 wherein the command generator creates a third number of copies of an address packet to be transmitted iteratively in sub-channels of multiple successive frames of the digitized analog data after the iterative transmission of the second number of copies of the command packet.

23. The control device for controlling operation of a digitized analog communication device of claim 22 wherein the command generator creates a fourth number of copies of a data packet to be transmitted iteratively in sub-channels of multiple successive frames of the digitized analog data after the iterative transmission of the third number of copies of the address packet.

24. The control device for controlling operation of a digitized analog communication device of claim 23 wherein the keyword packet, the command packet, address packet, and the data packet are each transmitted for sixty-four (64) iterations.

25. The control device for controlling operation of a digitized analog communication device of claim 24 wherein the keyword packet, the command packet, address packet, and the data packet is one byte (8 bits).

26. The control device for controlling operation of a digitized analog communication device of claim 24 wherein the keyword packet, the command packet, address packet, and the data packet are four (4) bits and may be constructed as two four (4) bit hexadecimal digits by two successive transmissions of the audio sub-channel with the control nibble to construct the full control symbol the two four (4) bit hexadecimal digits.

27. The control device for controlling operation of a digitized analog communication device of claim 24 wherein the keyword packet is the hexadecimal value (0X7E) for a tilde ().

28. The control device for controlling operation of a digitized analog communication device of claim 17 wherein serial digitized analog protocol has a plurality of time domain channels into which a plurality of digitized analog data wherein each digitized analog data represents a separate analog signal.

29. The control device for controlling operation of a digitized analog communication device of claim 18 further comprising a channel multiplexer that selects one time domain channel for transmission of the digitized analog signal, the keyword packet, and the command packet based on a word select signal generated by a master device.

30. A receiving device within a digitized analog communication device in communication with a control device to receive a digitized analog signal that is transmitted according to a serial data protocol comprising:
 a receiver for acquiring and conditioning a frame of the transmitted digitized analog signal that is truncated at a least significant bit location of the at least one frame of the digitized analog signal and contains a command word appended to the digitized analog signal; and
 a channel demultiplexer in communication with the receiver to receive the digitized analog signal and in communication with a master timing generator to receive a word select signal for identifying a channel in which the transmitted digitized analog signal is located to extract the digitized analog signal;
 a command detector counter in communication with the channel demultiplexer for iteratively receiving frames the extracted digitized analog signal, for examining the frames of the extracted digitized analog signal to determine if two or more of frames of the digitized analog signal is truncated and contains multiple iterations of the command word based upon the two or more receptions of sub-channels from the truncated frames of the digitized analog signal, wherein the command word comprises at least one keyword packet of a plurality of keyword packets followed by at least one command packet of a plurality of command packets.

31. The receiving device within a digitized analog communication device of claim 30 wherein the command detector counter receives a first number of frames the extracted digitized analog signal from the channel demultiplexer, for examining the first number of frames of the extracted digitized analog signal to determine that all the first number of the frames of the digitized analog signal have been truncated and contain a keyword packet that is a preamble of the command word appended to the digitized analog signal.

32. The receiving device within a digitized analog communication device of claim 31 further comprising:
 a sub-channel demultiplexer in communication with the channel demultiplexer for receiving the first number of frames of the digitized analog signal with the truncated analog signal with the appended keyword packet for extracting the keyword packet; and
 a command pipeline enable switch in communication with the command detector for activating the command pipeline enable upon receipt of the keyword packet and in communication with a command interpreter for transferring the command word to the command interpreter for execution.

33. The receiving device within a digitized analog communication device of claim 32 further comprising a data deserializer in communication with the sub-channel demultiplexer for deserializing the keyword packet.

34. The receiving device within a digitized analog communication device of claim 33 wherein the command detector counter further examines the extracted digitized analog signal to determine if a second number of frames of the digitized analog signal is truncated and contains a command packet from the command word and when the second number of frames contain the command packet, the truncated digitized analog signal with the appended command packet is transferred to the data demultiplexer for extracting the command packet.

35. The receiving device within a digitized analog communication device of claim 34 wherein the command packet is transferred from the sub-channel demultiplexer to the command deserializer for deserializing and transfer through the enable switch to the command interpreter within the receiver device for execution.

36. The receiving device within a digitized analog communication device of claim 35 wherein the command detector counter further examines the extracted digitized analog signal to determine if a third number of frames of the digitized analog word is truncated and contains an address packet from the command word and when the third number of frames contain the address packet, the truncated digitized analog signal with the appended address packet is transferred to the data demultiplexer for extracting the address packet.

37. The receiving device within a digitized analog communication device of claim 36 wherein the command packet is transferred from the sub-channel demultiplexer to the command deserializer for deserializing and transfer through the enable switch to the command interpreter within the receiver device for execution with the command packet.

38. The receiving device within a digitized analog communication device of claim 37 wherein the command detector counter further examines the extracted digitized analog signal to determine if a fourth number of frames of the digitized analog word is truncated and contains a data packet from the command packet and when the fourth number of frames contain the data packet, the truncated digitized analog signal with the appended data packet is transferred to the data demultiplexer for extracting the data packet.

39. The receiving device within a digitized analog communication device of claim 38 wherein the data packet is transferred from the sub-channel demultiplexer to the command deserializer for deserializing and transfer through the enable switch to the command interpreter within the receiver device for execution with the command and address.

40. The receiving device within a digitized analog communication device of claim 39 wherein the deserialized command is a read operation that requires only the address packet.

41. The receiving device within a digitized analog communication device of claim 39 wherein the deserialized command is a write operation that requires the address packet and the data packet for execution.

42. The receiving device within a digitized analog communication device of claim 39 wherein the keyword packet, the command packet, the address packet, and the data packet have a cyclic redundancy check field appended during transmission and the command detector counter comprises a cyclic redundancy check circuit for verifying the cyclic redundancy check field and if cyclic redundancy check fails, the command packet, the address packet, or the data packet is discarded and the command packet, the address packet, or the data packet is counted.

43. The receiving device within a digitized analog communication device of claim 39 wherein the keyword packet, the command packet, the address packet, and the data packet have a cyclic redundancy check field appended during transmission and the command detector counter comprises a cyclic redundancy check circuit for verifying the cyclic redundancy check field and if cyclic redundancy check fails, extracting of the keyword packet, command packet, address packet, or data packet is aborted.

44. The receiving device within a digitized analog communication device of claim 39 wherein the keyword packet, the command packet, the address packet, and the data packet have a cyclic redundancy check field appended during transmission and the command detector counter comprises a cyclic redundancy check circuit for verifying the cyclic redundancy check field and when cyclic redundancy check fails, the receiving device further comprises a transmitter for transmitting an error message to the control device requesting a retransmission of the command packet, the address packet, or the data packet.

45. An apparatus for controlling at least one digitized analog communication device from a control circuit communicating with the at least one digitized analog communication device with a serial digitized analog protocol over a network of a plurality of digitized analog communication devices, the apparatus comprising:
  means for periodically sampling and digitizing an analog signal;
  means for placing the digitized analog signal into periodic frames;
  means for serializing each frame of the digitized analog signal;
  means for truncating at least one of each frame of the digitized analog signal at a least significant bit location of the at least one frame of the digitized analog signal to create a sub-channel within the frame of the digitized analog signal;
  means for multiplexing a command word received from the control circuit within the sub-channel at least one of the periodic frames, wherein the command word comprises at least one keyword packet of a plurality of keyword packets followed by at least one command packet of a plurality of command packets;
  means for transmitting the truncated serial digitized signal with the command word multiplexed within the sub-channels of the frames over the network; and
  means for executing a command designated by the command word transmitted over the network iteratively received, extracted, and counted based upon two or more receptions by at least one other digitized analog device of the sub-channels of the frames.

46. The apparatus of claim 45 wherein the command word comprises a plurality of keyword packets that are transmitted iteratively within the sub-channels of a first number of frames of the truncated serial digitized analog signal.

47. The apparatus of claim 46 wherein the command word comprises a plurality of command packets that are transmitted iteratively within the sub-channels of a second number of frames of the truncated serial digitized analog signal.

48. The apparatus of claim 47 wherein the command word comprises a plurality of address packets that are transmitted iteratively within the sub-channels of a third number of frames of the truncated serial digitized analog signal.

49. The apparatus of claim 48 wherein the command word comprises a plurality of data packets that are transmitted iteratively within the sub-channels of a fourth number of frames of the truncated serial digitized analog signal.

50. The apparatus of claim 49 wherein the first, second, third, and fourth numbers are sixty-four (64).

51. The apparatus of claim 45 further comprising means for appending a cyclic redundancy code to the command word.

52. The apparatus of claim 47 wherein the means for executing the command of the command word comprises:
  means for receiving the first number of frames of the truncated serial digitized analog signal with the iteratively transmitted keyword packets of the command word within the sub-channel;
  means for extracting the keyword packets from each sub-channel;
  means for counting the keyword packets;
  means for receiving the second number of frames of the truncated serial digitized analog signal with the iteratively transmitted command packets of the command word within the sub-channel, when the count of the keyword packets is the first number;
  means for extracting the command packets from each sub-channel;
  means for counting the command packets; and
  means for executing the command by the digitized analog device, when the count of the command packets is the second number.

53. The apparatus of claim 48 wherein the means for executing the command of the command word comprises:
  means for receiving the first number of frames of the truncated serial digitized analog signal with the iteratively transmitted keyword packets of the command word within the sub-channel;
  means for extracting the keyword packets from each sub-channel;
  means for counting the keyword packets;
  means for receiving the second number of frames of the truncated serial digitized analog signal with the iteratively transmitted command packets of the command word within the sub-channel, when the count of the keyword packets is the first number;
  means for extracting the command packets from each sub-channel;
  means for counting the command packets;
  means for receiving by the third number of frames of the truncated serial digitized analog signal with the iteratively transmitted address packets of the command word within the sub-channel, when the count of the command packets is the second number and the command requires an address of a memory location within the digitized analog device;
  means for extracting the address packets from each sub-channel;
  means for counting the address packets; and
  means for executing the command with data present at the memory location by the digitized analog device, when the count of the address packets is the third number.

54. The apparatus of claim 49 wherein the means for executing the command of the command word comprises:
  means for receiving the first number of frames of the truncated serial digitized analog signal with the iteratively transmitted keyword packets of the command word within the sub-channel;
  means for extracting the keyword packets from each sub-channel;
  means for counting the keyword packets;
  means for receiving by the digitized analog communication device the second number of frames of the truncated serial digitized analog signal with the iteratively transmitted command packets of the command word within the sub-channel, when the count of the keyword packets is the first number;
  means for extracting the command packets from each sub-channel;
  means for counting the command packets;

means for receiving the third number of frames of the truncated serial digitized analog signal with the iteratively transmitted address packets of the command word within the sub-channel, when the count of the command packets is the second number and the command requires an address of a memory location within the digitized analog communication device and data to be stored within the address of the memory location;

means for extracting the address packets from each sub-channel;

means for counting the address packets; and means for receiving the fourth number of frames of the truncated serial digitized analog signal with the iteratively transmitted data packets of the command word within the sub-channel, when the count of the address packets is the third number; and means for storing the data to the memory location designated by the address and executing the command with data present at the designated memory location by the digitized analog device, when the count of the data packets is the fourth number.

55. The apparatus of claim 51 wherein the means for executing the command of the command word comprises:

means for receiving the frames of the truncated serial digitized analog signal with the iteratively transmitted packets of the command word within the sub-channels of the frames;

means for extracting the packets from each sub-channel;

means for checking the cyclic redundancy code of each of the packets; and means for declaring an error within the command word, when the cyclic redundancy code of any packets of the iterations of the command word fail.

56. The apparatus of claim 55 further comprising means for terminating the command word and informing a user of the digitized analog communication device that an error has occurred and the command cannot be executed.

57. The apparatus of claim 55 further comprising means for terminating the command word, transmitting a negative acknowledgement of receipt of the command word and requesting retransmission of the command word.

58. The apparatus of claim 45 wherein in the digitized analog signal is pulse coded modulated digital data.

59. The apparatus of claim 58 wherein in the digitized analog signal is a digital audio signal.

60. The apparatus of claim 59 wherein the digitized analog communication device comprises a loudspeaker for reproducing a digital-to-analog converted signal that is converted from the digital audio signal.

* * * * *